US 8,025,607 B2

(12) United States Patent
Ranky et al.

(10) Patent No.: US 8,025,607 B2
(45) Date of Patent: Sep. 27, 2011

(54) INSTRUMENTED HANDLE AND PEDAL SYSTEMS FOR USE IN REHABILITATION, EXERCISE AND TRAINING EQUIPMENT

(75) Inventors: Richard Ranky, Ridgewood, NJ (US); Mark Sivak, Boston, MA (US); Jeffrey Lewis, Jersery City, NJ (US); Judith Deutsch, Millburn, NJ (US); Brian Weinberg, San Diego, CA (US); Constantinos Mavroidis, Arlington, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 12/883,814

(22) Filed: Sep. 16, 2010

(65) Prior Publication Data
US 2011/0082009 A1 Apr. 7, 2011

Related U.S. Application Data

(60) Provisional application No. 61/242,997, filed on Sep. 16, 2009.

(51) Int. Cl.
A63B 71/00 (2006.01)
A63B 22/06 (2006.01)
A63B 69/16 (2006.01)

(52) U.S. Cl. ............................................. 482/8; 482/57

(58) Field of Classification Search .................. 482/1–9, 482/51–54, 57–65, 900–902; 601/23, 36; 434/61, 247, 255; 73/379.01–379.03, 379.06–379.07; 74/543, 74/560; 463/1, 6–7, 36; 600/300, 587, 592, 600/595; A63B 22/06, 22/12, 69/16, 71/00
See application file for complete search history.

(56) References Cited

U.S. PATENT DOCUMENTS

| | | | | |
|---|---|---|---|---|
| 5,240,417 A * | 8/1993 | Smithson et al. | ............... | 434/61 |
| 5,890,995 A * | 4/1999 | Bobick et al. | ...................... | 482/4 |
| 6,152,856 A * | 11/2000 | Studor et al. | ...................... | 482/8 |
| 6,786,848 B2 * | 9/2004 | Yamashita et al. | ................ | 482/8 |
| 2003/0134714 A1* | 7/2003 | Oishi et al. | .......................... | 482/6 |
| 2007/0042868 A1* | 2/2007 | Fisher et al. | ...................... | 482/8 |
| 2007/0123390 A1* | 5/2007 | Mathis | .............................. | 482/8 |
| 2008/0045374 A1 | 2/2008 | Weinberg et al. | | |
| 2008/0097269 A1 | 4/2008 | Weinberg et al. | | |
| 2008/0102424 A1* | 5/2008 | Holljes | .......................... | 434/247 |

(Continued)

FOREIGN PATENT DOCUMENTS
WO WO 2010/108170 9/2010

*Primary Examiner* — Loan Thanh
*Assistant Examiner* — Oren Ginsberg
(74) *Attorney, Agent, or Firm* — Weingarten, Schurgin, Gagnebin & Lebovici LLP

(57) ABSTRACT

A mechatronic exercise system, e.g., for rehabilitation, having instrumented handle and pedal systems and, preferably, an interactive virtual environment is disclosed. Alternatively, the instrumented handle and pedal systems are part of a virtual reality augmenting kit that can convert most types of exercise equipment, such as a stationary or exercise bicycle, ergometer, rowing machine or the like, into full virtual reality (VR) smart systems. In another embodiment, the instrumented handle and pedal systems can each be used separately with other types of devices. In a preferred embodiment, components embedded with sensors are implemented, e.g., on a stationary, exercise bicycle to monitor physiological and biomechanical parameters of the user. Signal data from the sensing components is used to immerse the user in a VR simulation so as to provide the user with visual, auditory, and haptic feedback to the user's performance.

27 Claims, 16 Drawing Sheets

U.S. PATENT DOCUMENTS

| | | |
|---|---|---|
| 2009/0017993 A1 | 1/2009 | Khanicheh et al. |
| 2009/0258758 A1* | 10/2009 | Hickman et al. ............. 482/8 |
| 2009/0306801 A1 | 12/2009 | Sivak et al. |
| 2010/0022354 A1* | 1/2010 | Fisher .................. 482/8 |
| 2010/0035726 A1* | 2/2010 | Fisher et al. ............ 482/8 |
| 2010/0041529 A1 | 2/2010 | Weinberg et al. |

* cited by examiner

INSTRUMENTED HANDLE AND PEDAL SYSTEMS FOR USE IN REHABILITATION, EXERCISE AND TRAINING EQUIPMENT

CROSS-REFERENCE TO RELATED APPLICATIONS

This application claims the benefit of U.S. Provisional Application No. 61/242,997, which was filed on Sep. 16, 2009.

STATEMENT REGARDING FEDERALLY SPONSORED RESEARCH OR DEVELOPMENT

This invention was made with government support under grant 1R13NS063655-01 awarded by the National Institutes of Health (NIH). The government has certain rights in the invention.

BACKGROUND OF THE INVENTION

Interest in coupling virtual environments with robotic devices and exercise equipment is high, which is, in part, based on findings that rehabilitative training on robotic devices that are augmented with virtual reality (VR) imaging has been shown to transfer to real world function better than training on robotic devices alone. These results are explained, in part, by the increased training intensity that a virtual environment provides. For example, stationary, exercise bicycles have been coupled with gaming applications in order to improve training intensity, to promote cardiovascular fitness. However, there are currently no modular systems that can adapt an existing, commercially-available, exercise device, such as a stationary or exercise bicycle, ergometer, rowing machine or the like, into a virtual reality augmented device that accepts separate inputs from each component.

BRIEF SUMMARY OF THE INVENTION

An exercise system, e.g., for rehabilitation, using novel hydraulic force-sensing handles and smart pedal modules, which, preferably, are interfaced with a virtual environment, is disclosed. The system of the invention is sensorized, modular, and mechatronic system and is useful, e.g., for fitness training and/or rehabilitation. An exemplary system of the invention, e.g., a sensorized stationary, exercise bicycle system, is provided with discrete, instrumented and modular pedal and handle bar systems. The instrumented bicycle pedals are used, e.g., to evaluate kinetic/kinematic capabilities of users having healthy and/or plegic lower extremities. Hydraulic force-sensing handle bar sensors are used, e.g., to assess gripping forces of the user's hands.

Preferably, a local or remote controller uses physiological input, e.g., heart rate, and biomechanical input, e.g., kinetics and kinematics, to drive a virtual environment while at the same time collecting performance data. Heart rate can be used as a measure of a user's level of exertion, which, in turn, can be used as a means to control and to modify the difficulty of a virtual reality game that interfaces with the stationary, exercise bicycle.

Potential uses for the system of the invention or for its individual components described herein are provided for the purpose of illustration only and not as limitation. The individual components described above can be used with an exercise system as a complete kit or as individual components, or the individual module components can be used with alternative devices or with new custom software. For example, the handle bar module and modifications thereof can be incorporated or integrated into gym equipment, a weight lifting monitoring device, rowing bars, a control/input device for personal/industrial computers, a steering wheel control/sensor, a virtual reality input device, a computer haptic input device, a rehabilitation tool for upper extremities, a Wii-Mote/game controller accessory, a dexterity/strength training tool, an industrial monitoring device, an ergonomics and comfort grip device, and assembly line monitoring. The pedal system module and modifications thereof can be incorporated or integrated into an attachment to non-stationary bike, a control/input device for personal/industrial computer, for stance monitoring for weight lifting, for stance monitoring for industrial line work, for force monitoring in a motor vehicle, as a virtual reality input device, a computer haptic input device, a rehabilitation tool for lower extremities, an ankle control and strength training tool, and a boarding simulator/trainer, e.g., for snowboarding, surfing, wakeboarding, snow-shoeing, and the like.

In one embodiment, the present invention discloses a pedal assembly module for measuring a force and range of motion of a mammalian lower extremity during user interaction with a stationary, exercise bicycle or other mechatronic device. The pedal assembly module includes a pedal having a pedal raceway; a compression load cell that is disposed directly or substantially directly beneath the pedal raceway, for measuring load from the lower extremity on the pedal and for providing kinetic and kinematic parameter data to a processing device; a spatial orientation detection device, e.g., a multi-axis accelerometer, for sensing static pedal tilt by measuring a range of motion of an ankle of the user and for providing tilt parameter data to the processing device; and a sensing device for sensing velocity and for providing velocity parameter data to the processing device. Optionally, the pedal assembly module can include at least one vibrating devices for providing haptic feedback to the user; at least one of a foot plate, a force block, an intermediate block, and a counterweight block for transferring load on the pedal to the compression load cell; a bolt and spring assembly that is integrated into the bottom of pedal to provide pre-load compression for measuring tensile loads in the load cell; and/or a binding scheme for securing a user's foot to the pedal.

The pedal raceway is structured and arranged to mechanically couple to a crankshaft of the stationary, exercise bicycle. Optionally, the pedal raceway provides points of attachment for at least one of a cage and a toe clip.

The force block comprises a plurality of portions that are adapted to fit around the pedal raceway and to keep the load off of said pedal raceway.

The binding scheme can include front and rear binding ladder portions for releasably securing the user's foot to a foot plate, each portion securely and releasably attached to the foot plate, and front and rear binding pads for providing comfort to a dorsal side of the user's foot. Moreover, the binding scheme is structured and arranged so that a user's metatarsal-phalanges joint is immediately above or substantially immediately above an axis of rotation of the pedal.

Preferably, the velocity sensing device is a Hall effect sensing device that is mounted on the pedal raceway distant from the axis of rotation, in combination with a plurality of magnetic field-generating posts and the spatial orientation detection device is an accelerometer that is fixedly attached to the foot plate via a mounting bracket so that a y-axis of rotation of the accelerometer is parallel or substantially parallel with an axis of rotation of the pedal raceway. Velocity parameter data generated controls dynamic motion and a speed of a virtual user rider avatar in a virtual environment.

Static pedal tilt parameter data generated by the multi-axis accelerometer controls an alignment and angle of tilt of a virtual avatar in a virtual environment.

In a second embodiment, the invention discloses a handle bar assembly module for measuring a gripping and/or turning force applied by a mammalian extremity during user interaction with a stationary, exercise bicycle or other mechatronic device and for generating an output signal commensurate therewith. The handle bar assembly module includes a multi-piece handle bar housing that is structured and arranged to releasably attach to a handle bar of the bicycle and that includes a plurality of channels; a plurality of hydraulic chambers for carrying compressible hydraulic fluid, each of the hydraulic chambers includes an effective sensing area and, further, is mounted in the channels of each piece of the multi-piece handle bar housing; one or more multi-piece handle caps that are disposed at a distal and at a proximal end of the handle bar housing and that are structured and arranged to releasably attach over said ends of the handle bar housing, which is to say, outside of the effective sensing zone, the handle caps including at least one channel that is adapted to receive a loop in the hydraulic chamber; and at least one sensing device that is fluidly coupled to the hydraulic chamber for sensing a change in fluid pressure therein.

Preferably, the hydraulic chamber is selected from the group consisting of deformable PVC tubing, semi-clear silicone rubber tubing, and rubber tubing have a Shore hardness of durometer 50 A. Moreover, a first end of the hydraulic chamber is fitted with a plug and a second end of the hydraulic chamber is fluidly coupled to the sensing device for sensing a change in fluid pressure. More preferably, each of the channels has a width and a depth that are selected to constrain the hydraulic chambers in a slightly compressed state.

Preferably, the first sensing device is fluidly coupled to a first hydraulic chamber mounted in a first handle bar housing portion disposed on a dorsal surface of the handle bar and a second sensing device is fluidly coupled to a second hydraulic chamber mounted in a second handle bar housing portion disposed on a ventral surface of the handle bar. Moreover, the at least one sensing device is fluidly coupled to a first and to a second hydraulic chamber, which are mounted in corresponding portions of the multi-piece handle bar housing. The at least one sensing device is electrically coupled to a processing device to which the sensing device(s) transmits fluid pressure parameter signals for controlling dynamic motion of a virtual avatar in a virtual environment.

In a third embodiment, the present invention discloses a method of generating and displaying a virtual environment based on parameter data generated by a user of the exercise bicycle or other mechatronic device during a user session. The method includes, for example: sensing forces applied by each foot of a mammalian user to a corresponding pedal assembly module; outputting first parameter data signals commensurate with the forces applied; sensing a static pedal tilt of each foot of the mammalian user about a corresponding pedal assembly module; outputting second parameter data signals commensurate with the static pedal tilt; controlling an alignment and angle of tilt of a virtual avatar in the virtual environment using said second parameter data signals; sensing a gripping force by each hand of the mammalian user; outputting fluid pressure parameter signals commensurate with the gripping force; and controlling dynamic motion of the virtual avatar in the virtual environment using said fluid pressure parameter signals.

Advantageously, the sensing forces applied by each foot include sensing forces in both compression and tension using a single-axis compression load cell and sensing a gripping force includes sensing gripping forces applied to a dorsal surface and to a ventral surface of a handle bar assembly. Sensing can includes measuring a differential pressure between forces applied to the dorsal and to the ventral surfaces or measuring forces applied to a front and rear portion of the handle bar.

Sensing pedal tilt of each foot about a corresponding pedal assembly module includes using at least one of a Hall effect sensor and an inertial measurement unit.

Optionally, the method further includes sensing a heart rate of the user during a user session; outputting heart rate parameter data signals commensurate with the heart rate; and controlling a velocity of a virtual pace rider in the virtual environment using said heart rate parameter data signals. Furthermore, the method includes controlling a yaw of the virtual avatar a differential force between gripping forces applied by a left hand to a left handle bar and gripping forces applied by a right hand to a right handle bar. Haptic feedback can be provided to at least one of the user and the stationary, exercise bicycle.

In a fourth embodiment, the invention discloses a virtual reality augmented system for a stationary, exercise bicycle or other mechatronic device for generating and displaying a virtual environment based on parameter data generated by a user of the exercise bicycle or other mechatronic device during a user session. The system includes pedal assembly modules for sensing forces in both compression and tension using a single-axis compression load cell with mechanical preload and for sensing static pedal tilt, to measure force tilt for each foot; handle bar assembly modules for sensing gripping forces on the bicycle handle bar, to measure force for each hand; a processing device that is structured and arranged to receive parameter data from each of the handle bar assembly modules and from each of the pedal assembly modules and to use said parameter data to drive a virtual environment that is viewable by the user; a data acquisition system that is electrically coupled to each pedal assembly module and each handle bar assembly module to receive parameter data therefrom and that is structured and arranged to process said parameter data and to transmit said data, e.g., using UDP, to the processing device; and a display device that is disposed proximate to the stationary, exercise bicycle to be viewable by the user, the display device displays the virtual environment generated by the processing device.

Optionally, the system can further include a heart rate sensing device having a chest band that is attached to the user and that is structured and arranged to generate heart rate parameter data and to transmit said data to a signal processing device that are used to establish a speed of a virtual pace rider avatar in the virtual environment. Preferably, the heart rate sensing device is adapted to re-modulate a communication frequency with the signal processing device when other sensing device are proximate the chest band, to improve noise reduction and cross-talk.

Optionally, the system further comprising a practitioner's interface that is structured and arranged to display parameter data from each of the pedal assembly modules, from each of the handle bar modules, and from the heart rate sensing device to provide real-time and historic parameter data. The handle bar assembly module includes at least one sensing device is electrically coupled to the processing device and said sensing device is adapted to transmit fluid pressure parameter signals for controlling dynamic motion of a virtual avatar in the virtual environment. The pedal assembly module includes a spatial orientation detection device, e.g., a multi-axis accelerometer, that is electrically coupled to the processing for transmitting static pedal tilt parameter data for controlling an alignment and angle of tilt of a virtual avatar in the virtual environment. Additionally, the pedal assembly module also includes a velocity sensing device that is electrically coupled to the processing device and adapted to transmit velocity parameter data to for controlling dynamic motion and a speed of a virtual, pace avatar in the virtual environment.

In a sixth embodiment, the invention discloses a virtual reality augmented system for a stationary, exercise bicycle or other mechatronic device for generating and displaying a virtual environment based on parameter data generated by a user of the exercise bicycle during a user session. The system includes pedal assembly modules for sensing forces in both compression and tension using a single-axis compression load cell with mechanical preload and for sensing static pedal tilt, to measure force tilt for each foot; handle bar assembly modules for sensing gripping forces on the bicycle handle bar, to measure force for each hand; a processing device that is structured and arranged to receive parameter data from each of the handle bar assembly modules and from each of the pedal assembly modules and to use said parameter data to drive a virtual environment that is viewable by the user; and a data acquisition system that is electrically coupled to each pedal assembly module and each handle bar assembly module to receive parameter data therefrom and that is structured and arranged to process said parameter data and to transmit it to the processing device. Optionally, the system further includes a display device that is disposed proximate to the stationary, exercise bicycle or other mechatronic device to be viewable by the user, the display device displays the virtual environment generated by the processing device.

BRIEF DESCRIPTION OF THE SEVERAL VIEWS OF THE DRAWINGS

Other features and advantages of the invention will be apparent from the following description of the preferred embodiments thereof and from the claims, taken in conjunction with the accompanying drawings, in which:

DETAILED DESCRIPTION OF THE PREFERRED EMBODIMENTS OF THE INVENTION

U.S. Provisional Application No. 61/242,997, from which the benefit of priority is claimed, is incorporated herein by reference.

Figure 1:
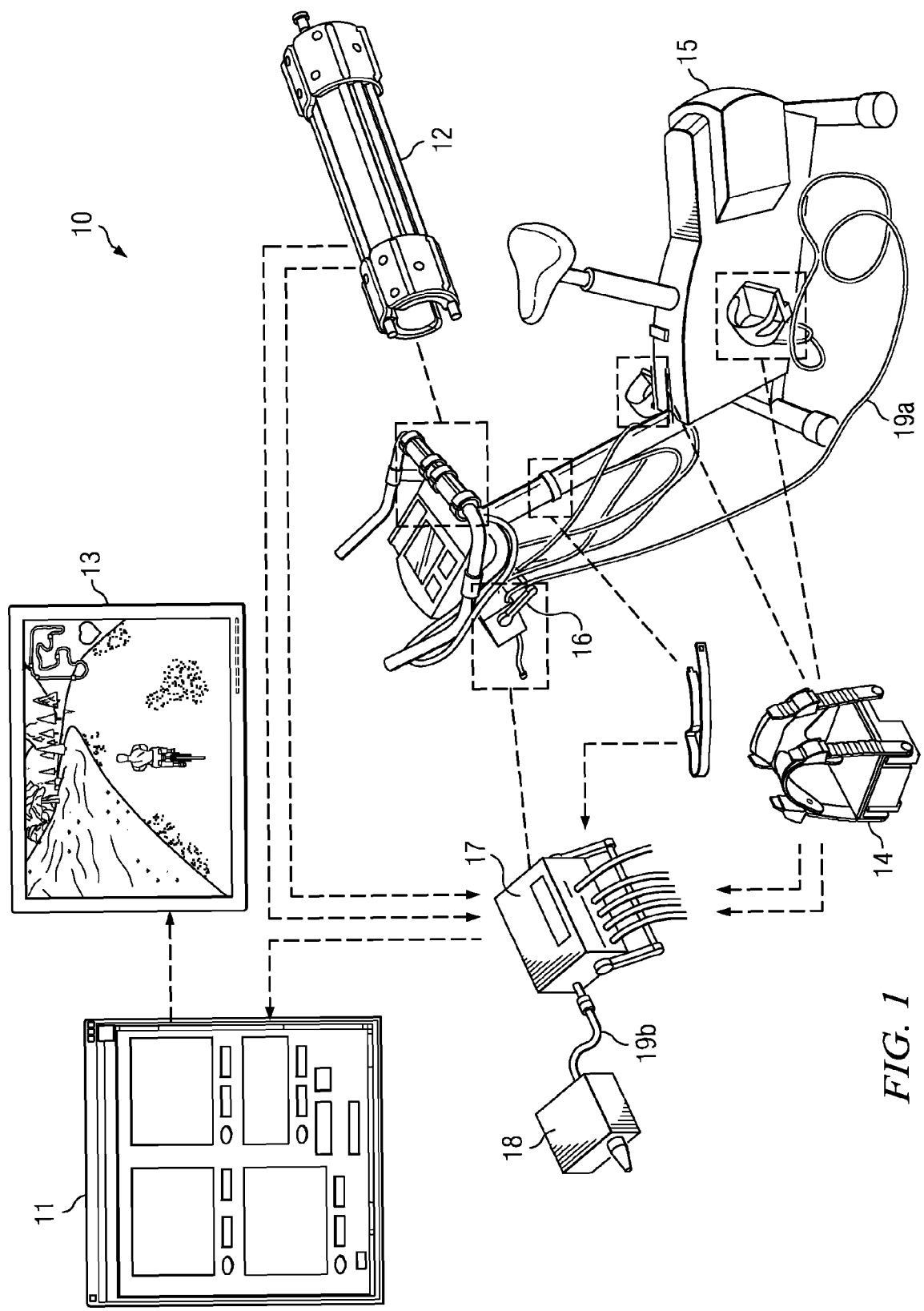
FIG. 1 shows an embodiment of an exemplary stationary bicycle system according to the invention as claimed.

An illustrative embodiment of a virtual reality augmented cycling kit according to the invention is shown in FIG. 1. The complete system 10 includes hardware and software components that can be organically integrated into a stationary, exercise bicycle 15 for that purpose or that can be added to an existing commercially-available, stationary, exercise bicycle 15 that did not include the components at the time of original purchase. The hardware and software components monitor and capture kinetic, kinematic, and physiological parameters of a user and, using that data, simulate a virtual environment for the user.

The system 10 includes novel, modular, hardware components having a plurality of embedded sensors to enhance the use of a typical stationary, exercise bicycle 15. The modular hardware components include a pair of identical or substantially identical, instrumented handle bar modules 12 and a pair of identical or substantially identical, instrumented pedal modules 14. Each of the modular pairs 12 and 14 is structured and arranged to provide corresponding signal data to a local or a remote signal data processing box ("signal box" 17). These data can be provided via signal wires 19a or wirelessly. A local signal box 17 can be integrated into the stationary, exercise bicycle 15, whereas a remote signal box 17 can be integrated into a practitioner's processing device (not shown). Optionally, the system 10 includes a heart rate sensing device 16 with which physiological data, e.g., heart rate data, can be measured and provided to the signal box 17.

Data signals from the two handle bar systems 12, the two pedal systems 14, and the heart rate sensing device 16 are processed, stored, and converted into a format that is usable by a practitioner interface 11 as part of the practitioner's processing device. For example, the signal box 17 is structured and arranged to sort data from the sensing systems 12, 14, and 16 and to streamline these data into a User Datagram Protocol (UDP) signal. Preferably, the UDP signal can be used to drive custom-developed virtual environment software (not shown) to generate virtual reality (VR) images for display on a local and/or a remote display device 13.

Each of the components is electrically coupled, e.g., via a hard wire 19b or wirelessly, to a power supply device ("power box" 18"). Each component can be adjusted for sensitivity or can be turned ON and OFF by the practitioner to further control and customize the user's exercise regimen.

Instrumented Handle Bar Module

An instrumented handle bar module 12 will now be described. The handle bar module 12 is a novel type of hydraulic dynamometer that is structured and arranged to measure the discrete physical forces applied by each of a user's hands to the front and back of a handle and to provide data for controlling dynamic motion of the virtual user in the virtual environment. Although the handle bars of stationary, exercise bicycles 15 themselves are static, with the present invention, a user can apply measurable turning forces to the handle bar modules 12 to simulate turning forces associated with a conventional bicycle. Data associated with these measureable turning forces are streamlined to cause the virtual user in the image of the virtual environment 13 on the display device to perform a turning movement commensurate with the user's applied forces. Advantageously, the inherent compressibility and elasticity of the hydraulic chambers provide a haptic feedback to the user as he/she applies isokinetic and turning forces.

Figure 2A:
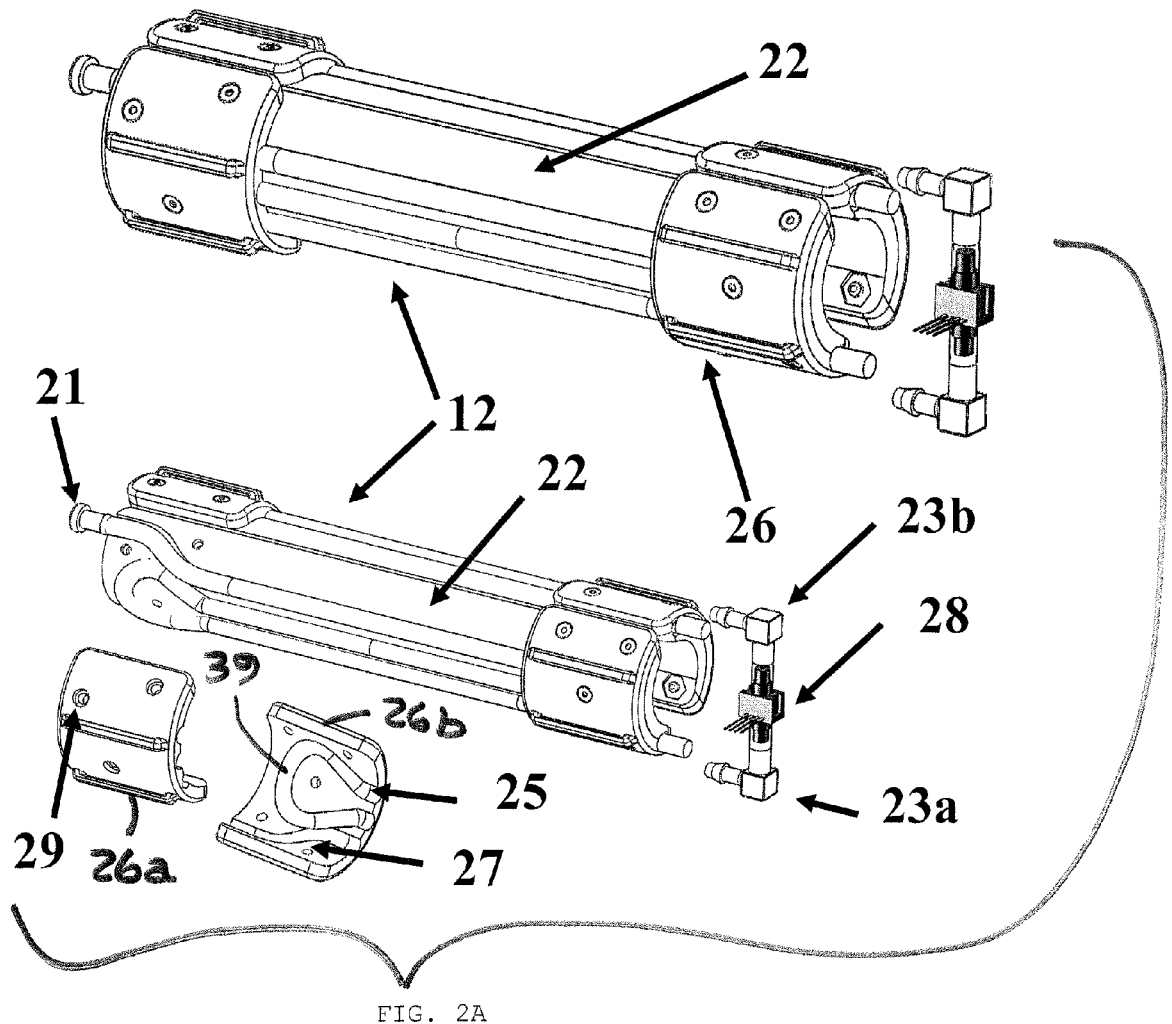
FIG. 2A shows a diagrammatic view of a first embodiment of an instrumented handle bar module for the stationary bicycle system shown in FIG. 1.

An illustrative embodiment of a handle bar module 12 is shown in FIG. 2A. Within the overall system 10, sensing devices integrated into the handle bar module 12 control the trajectory of the user rider in the virtual environment 13. More specifically, the net differential forces between the left and right handle bar modules 12 can be used to control the yaw or heading of the user rider in the virtual environment 13 in order to steer the user's virtual bicycle. Steering maintains the virtual user on the preferred riding trail and allows the user to avoid obstacles, such as mud holes.

Modules 12 are structured and arranged to fit over each of the handle bars of a stationary, exercise bicycle 15. Each module 12 includes a multi-piece handle bar housing 22, a plurality of hydraulic chambers 24, e.g., deformable PVC tubing such as semi-clear clear silicone rubber having a Shore hardness of durometer 50 A, and a pair of multi-piece handle caps 26a and 26b. The hydraulic fluid inside the hydraulic chambers 24 can be, for example, de-ionized water, mineral oil or hydraulic fluid. A plug 21 is removably attached at a first end of each hydraulic chambers 24, to make the first end air- and watertight. The second ends of each hydraulic chamber 24 are fluidly coupled to a pressure sensing device 28 via corresponding pressure-reducing elbow connections 23a and 23b. In operation, user-applied gripping forces are applied to one or more of the hydraulic chambers 24, compressing the PVC tubing and building up pressure at the second end of one or more hydraulic chambers 24 and at the pressure sensing device 28. The sensing device 28 measures the applied pressure, outputting pressure data signals to the signal box 17.

Figure 2B:
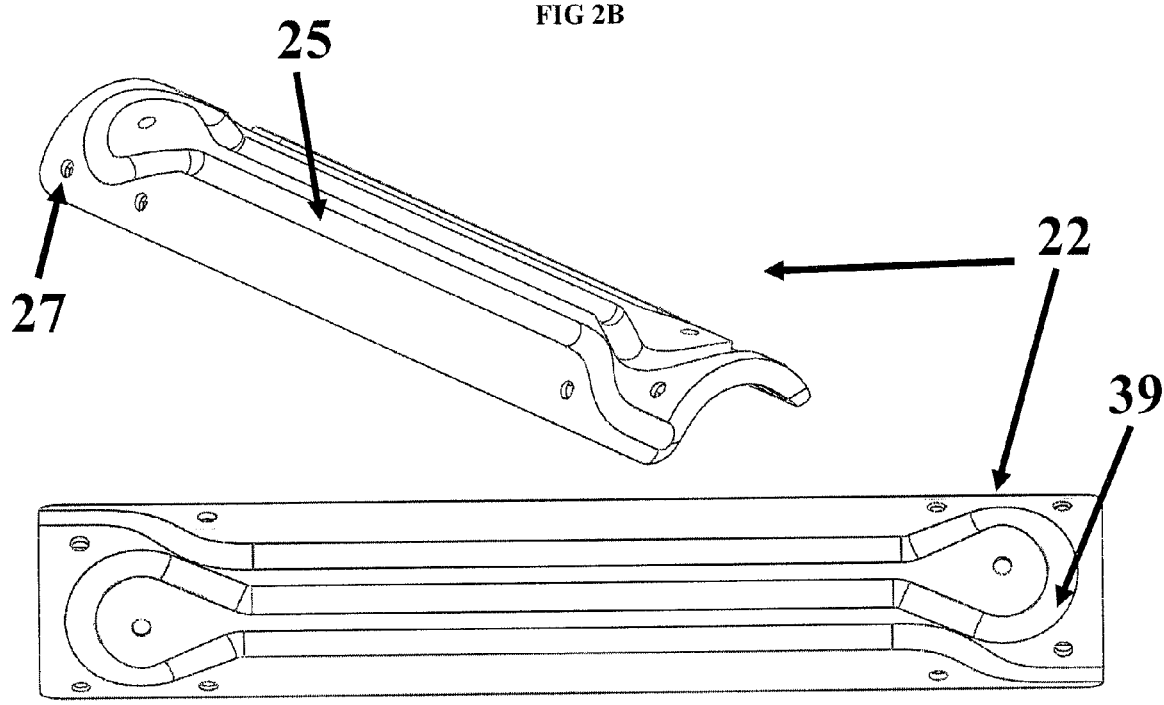
FIG. 2B shows two diagrammatic views of the housing portions of the handle bar modules shown in FIG. 2A.

Referring to FIG. 2B, illustrative details of the multi-piece handle bar housing 22 are shown. Each of the multi-piece handle bar housing 22 can be manufactured of a plastic or rubber material that is cylindrical or substantially cylindrical in shape, to readily fit over the handle bars of a stationary, exercise bicycle. The outer diameter of the handle bar housing 22 is selected to provide the greatest ergonomic comfort for grasping by the user while allowing the user to comfortably maximize his/her isokinetic strength.

A plurality of openings 27 is provided in each portion of the multi-piece handle bar housing 22 for receiving an attaching device, e.g., a bolt, rivet, industrial screw, and the like, to attach one portion to the other about the handle bars of the stationary, exercise bicycle.

Channels 25 are provided in the handle bar housing portions 22 to accommodate the hydraulic chambers 24 in order to minimize pressure loss during load application. Fabrication of the handle bar housing portions 22 using additive fabrication, e.g., stereolithography or fused deposition modeling, makes the contours of these channels 25 possible. Preferably, the width and depth of the channels 25 are selected to constrain the hydraulic chambers 24 in a slightly compressed state. This compression pre-loads the PVC tubing 24, causing a slight, undesirable expansion of the unconstrained tubing 24. To account for this expansion, a filling protocol is needed at the time of manufacture so that the initial pressure within the hydraulic chamber 24 is as close to zero as possible. Normally, in operation, when load is applied over an area, any portion of the PVC tubing making up the hydraulic chamber 24 that is not is direct compression will expand if not confined in a channel 25, which causes pressure losses within the chamber 24. Constraining the hydraulic chambers 24 within the channels 25 in the housing portions 22 reduces such pressure losses.

Similarly, referring to FIG. 2A, each portion 26a and 26b of the multi-piece handle caps 26 can be manufactured of a plastic or rubber material that is cylindrical or substantially cylindrical in shape, to readily fit over the handle bar housings 22 and the hydraulic chambers 24. A plurality of openings 27 are provided in each portion 26a and 26b of the multi-piece handle cap 26 for receiving an attaching device 29, e.g., a bolt, rivet, industrial screw, and the like, to attach one portion 26a to the other 26b about the handle bar housings 22 and the hydraulic chambers 24.

Channels 25 are also provided in the handle cap portions 26a and 26b to accommodate the hydraulic chambers 24. Fabrication of the handle cap portions 26a and 26b using additive fabrication, e.g., stereolithography or fused deposition modeling, makes the contours of these channels 25 possible. Preferably, the width and depth of the channels 25 are selected to constrain the hydraulic chambers 24 in a slightly compressed state. Each portion 26a and 26b of the multi-piece handle caps 26 includes a loop 39 having the minimum bending radius of the PVC tubing to avoid kinking or pinching.

Each portion of the hydraulic chambers 24 in each handle bar module 12, preferably, is made of a single length of tube, e.g., PVC tubing, that is guided along channel contours 25 embedded in the housing geometry. Preferably, the portions of the hydraulic chambers 24 beneath the handle caps 26 and elsewhere are rigidly constrained to minimize pressure loss due to expansion of the flexible tubing.

A potential disadvantage of the first handle bar module embodiment is that the module uses a differential sensor that outputs a net force between the loads applied to the front portion, e.g., by the user's fingers, and to the rear portion, e.g., by the butt of the user's hand. As a result, a zero net force output may be interpreted in one of two ways: either there is no load being applied to the front and rear portions or the loads being applied are equal, hence producing a net zero force.

Figure 2C:
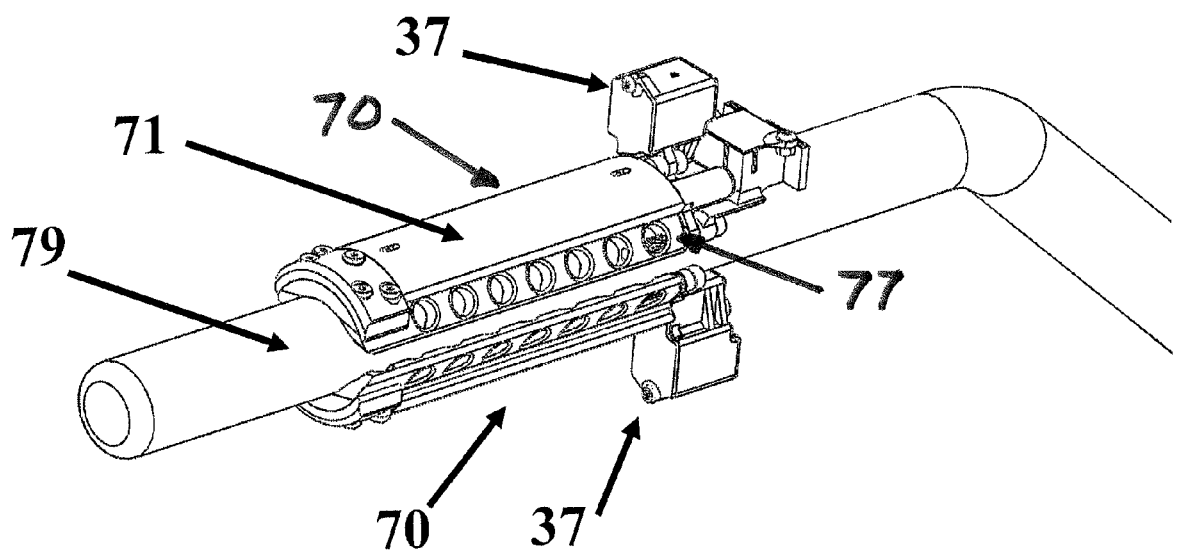
FIG. 2C shows a diagrammatic view of second embodiment of an instrumented handle bar module for the stationary bicycle system shown in FIG. 1.
Figure 2D:
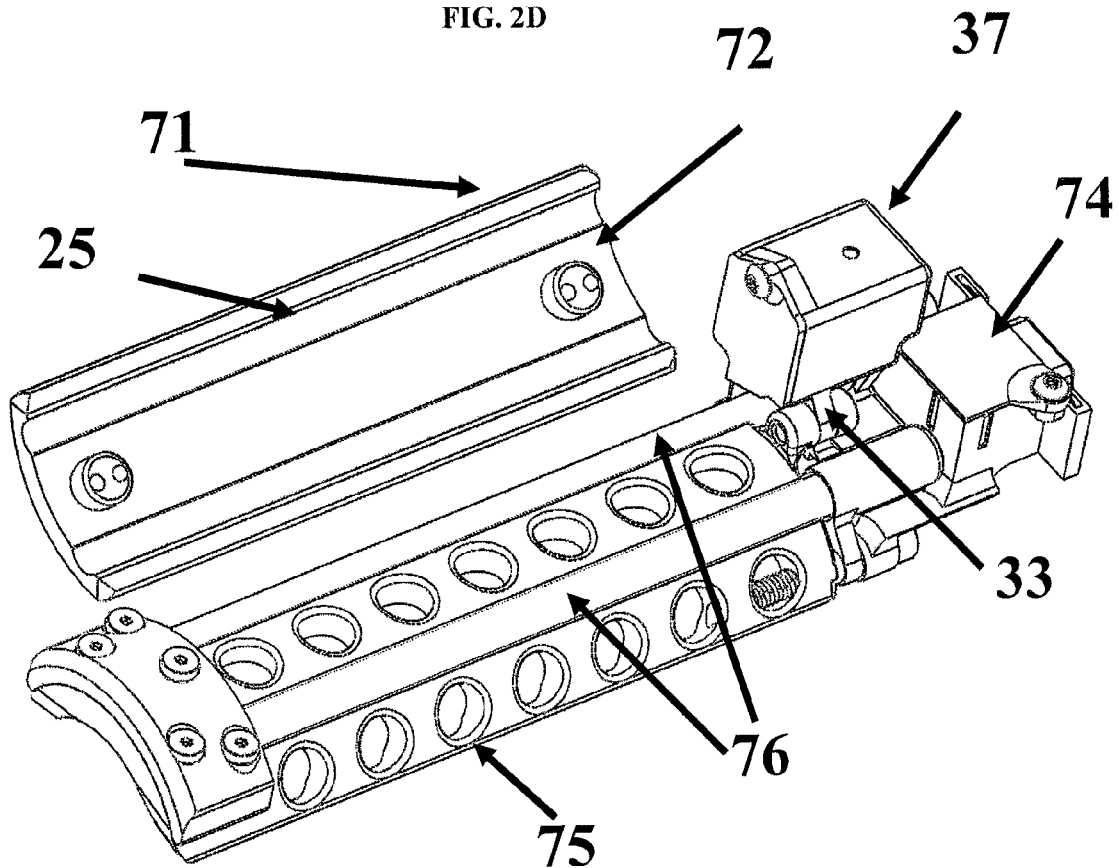
FIG. 2D shows a diagrammatic view of the handle bar module shown in FIG. 2C with the housing paddle removed.
Figure 2E:
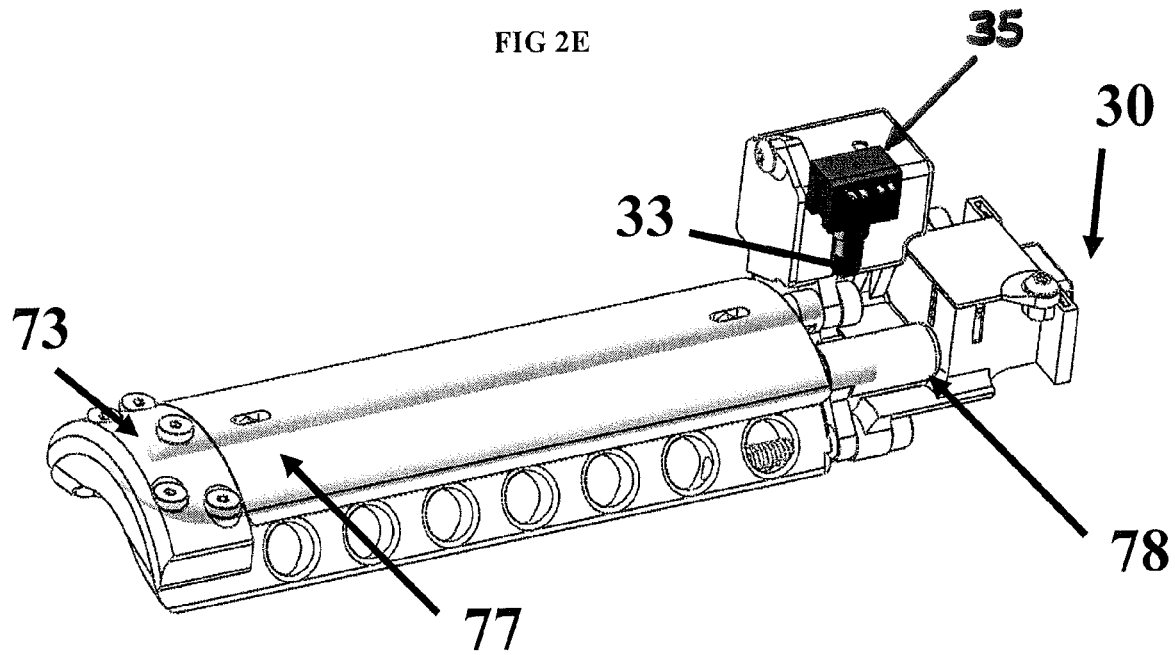
FIG. 2E shows a diagrammatic view of the handle bar module shown in FIG. 2C showing the hydraulics, sensors, and electronics within the housings.

Referring to FIGS. 2C to 2E, a second embodiment of a handle bar module 12 that assuages this shortcoming is shown. The second embodiment is 37% shorter than the first embodiment and uses 73% less material by volume and, moreover, provides greater modularity and increased sensing functionality. The principal improvement involves replacing the single differential pressure sensing device 28 with plural sensing devices disposed on the dorsal ("rear") and ventral ("front") surfaces. Indeed, clinical data, based on measurements of loads applied to both the front and rear surfaces of the handle bar, also measure residual tension in the user's hands when the user is not effecting a turning movement. This is particularly relevant in the care and treatment of users having strong pronation or spasticity in their affected hands.

Furthermore, by isolating each sensing side, the hydraulic chambers can be made simpler by reducing the number of connections and can be made more robust by housing and protecting these connections against accidental collisions. Additionally, use of a medium-density mineral oil as a hydraulic fluid and selection of a less flexible tubing, e.g., silicone tubing such as a TYGON composite, in lieu of PVC tubing reduces air bubbles in tubing after prolonged use due to the drastically lower constant of air permeation, i.e., infiltration, associated with the former.

Each of the improved handle bar modules 12 includes front and rear housings portions 70 that are releasably coupled to each other on opposing sides of the handle bar 79. Each housing portion 70 includes a base portion 77, a housing paddle portion 71, and a restraining cap 73, which are all curvilinear in shape to form around a cylindrical handle bar 79.

Similar to the handle bar housing 22 of the first embodiment, the base portion 77 is adapted to house hydraulic chambers 76 in a channel contour 25 and to be securely and releasably attached to the handle bar 79. The base portion 77 can be fabricated from a plastic or rubber material. To reduce the volume of material, a plurality of openings 75 can be provided in the base portion 77. At least two of the openings 75 in the base portion 77 are also used to provide a tight interference fit between a pair of alignment and fastening tabs 72 provided on the housing paddle 71 for attaching the latter to the former.

The paddle housing portion 71 can also be fabricated from a plastic or rubber material and is adapted to include the plurality of alignment and fastening tabs 72 for coupling the paddle housing portion 71 to the base portion 77 and channel contours 25 for confining the hydraulic chambers 76. The restraining cap 73 is structured and arranged to fit over the loop portion of the hydraulic chamber 76, to prevent or minimize the volumetric expansion of the tubing of the hydraulic chambers 76.

As described previously, first ends of the hydraulic chambers are fitted with a plug 78 while the other, second ends are fluidly coupled to pressure sensing devices 35, e.g., via elbow connections 33, which are enclosed in a protective hydraulic sensor enclosure 37. The pressure sensing devices 35 are adapted to generate parameter data signals, which can be transmitted to the signal box 17 via a shared electronics housing 74, e.g., via a multi-pin cable 30. Advantageously, the second embodiment disposes one sensor 35 on each of the front and rear sides of the handle bar module 12, doubling the number of sensors per module 12. In addition to enabling a practitioner to differentiate between a no load condition and a net zero force condition, having sensors 35 on the front and rear portions provides a better measure of turning forces.

Advantageously, handle bar modules 12 are inexpensive compared to alternatives having compression load cell. Moreover, the inherent elasticity and spring return of hydraulic chambers made of polyamides, e.g., NYLON, provide a haptic feedback to the user as he/she increases isokinetic forces to make sharper turns. The chamber arrangement measures net force from the specific side of each hand, rather than just the net torque about the front fork as with some previous work. This is advantageous because only one sensor is required per handle to measure inputs from two surfaces.

Strain gauge amplifier units (SGAU) such as those manufactured by Industrologic of St. Charles, Mo. can be provided to amplify the signal outputs from the handle bar pressure sensors. These amplifiers include a full Wheatstone bridge and have an operating range of 8-30V DC with a built-in 5V regulator for the sensor excitation. These amplifiers can operate by bridging the GND and V-terminals or bi-polar mode using a negative voltage supply.

For example, the SGAU circuit assembly has a fixed gain resistor of 100 ohms in series with a 1K trimmer potentiometer (VRG), allowing the amplifier gain to range from 1000 with the trimmer fully clockwise (100 ohms) to 90.9 with the trimmer fully counterclockwise (1100 ohms). The voltage signal offset may be adjusted by turning the VRO terminal. The span of the load cell amplifiers were shunt calibrated to each load cell using a 59 kΩ resistor to bridge the E- and S-terminals and then adjusting the voltage offset to zero when the resistor was removed.

Instrumented Pedal Module

The instrumented pedal module is structured and arranged to measure lower extremity forces and ranges of motion during user interaction with the stationary, exercise bicycle. The novel features of the pedal module 14 include sensing forces applied to the pedal of the bicycle in both compression and tension using a single-axis compression load cell with mechanical preload and individually measuring force for each foot rather than an indistinguishable average between the two.

In particular, the pedal module and its sensing elements are adapted to measure compressive and/or tensile forces exerted on the pedal by the user's individual feet; to measure the range of motion for dorsiflexion and plantarflexion during exercise; and to measure the rotational velocity (in RPMs) of the pedal. The pedal module is adapted to interface easily with any commercially-available stationary, exercise bicycle and to retain the user's feet securely without the need for specialized footwear. Advantageously, optional electronics can be integrated into the pedal module to provide haptic feedback to the foot.

Figure 3A:
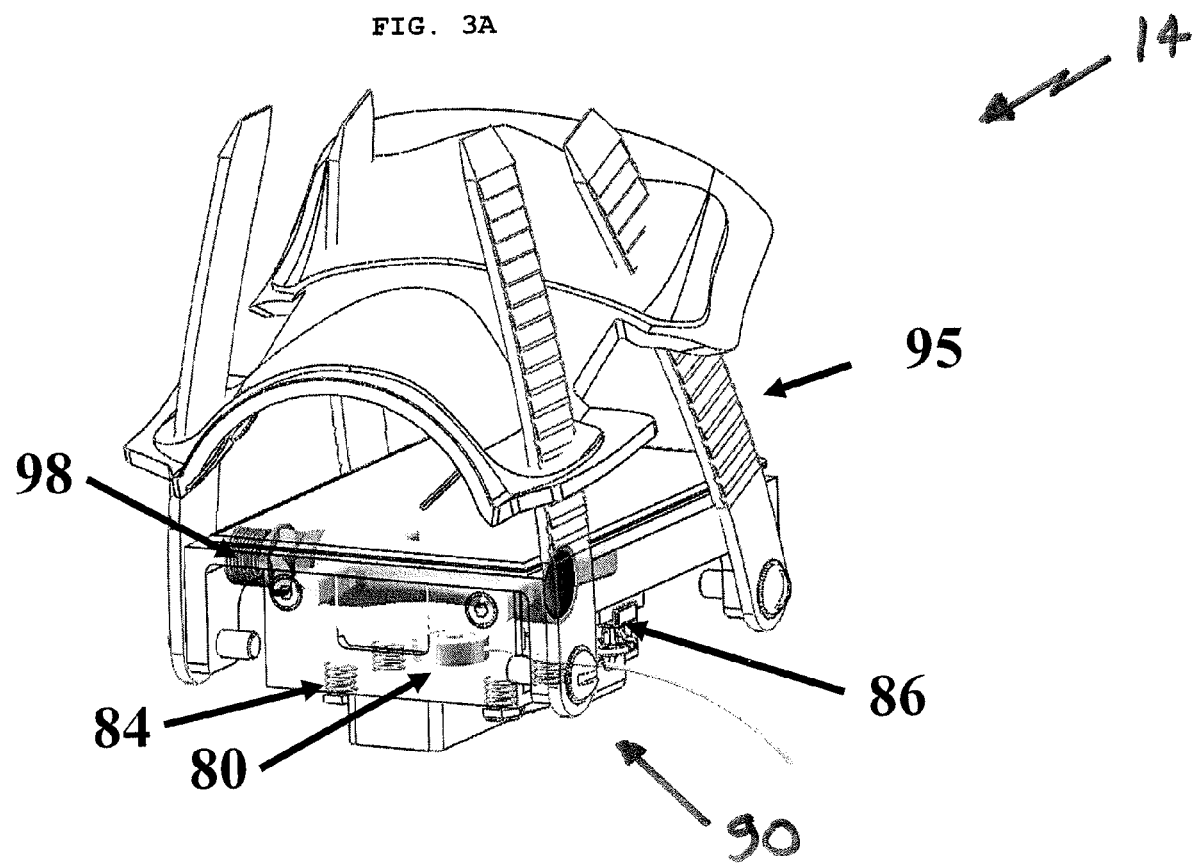
FIG. 3A shows an instrumented pedal module for the stationary bicycle system shown in FIG. 1.
Figure 3B:
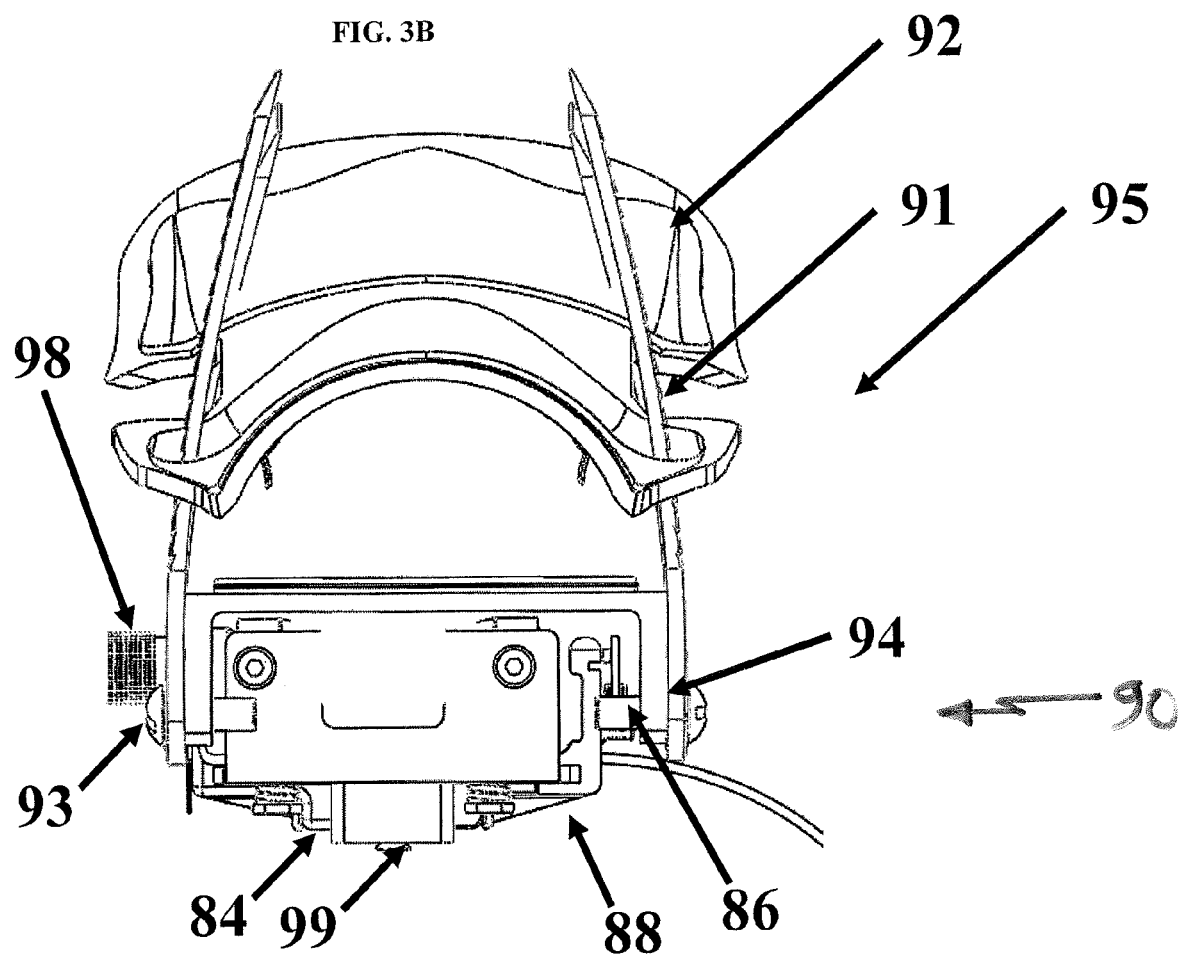
FIG. 3B shows a front view of an instrumented pedal module shown in FIG. 3A.
Figure 3C:
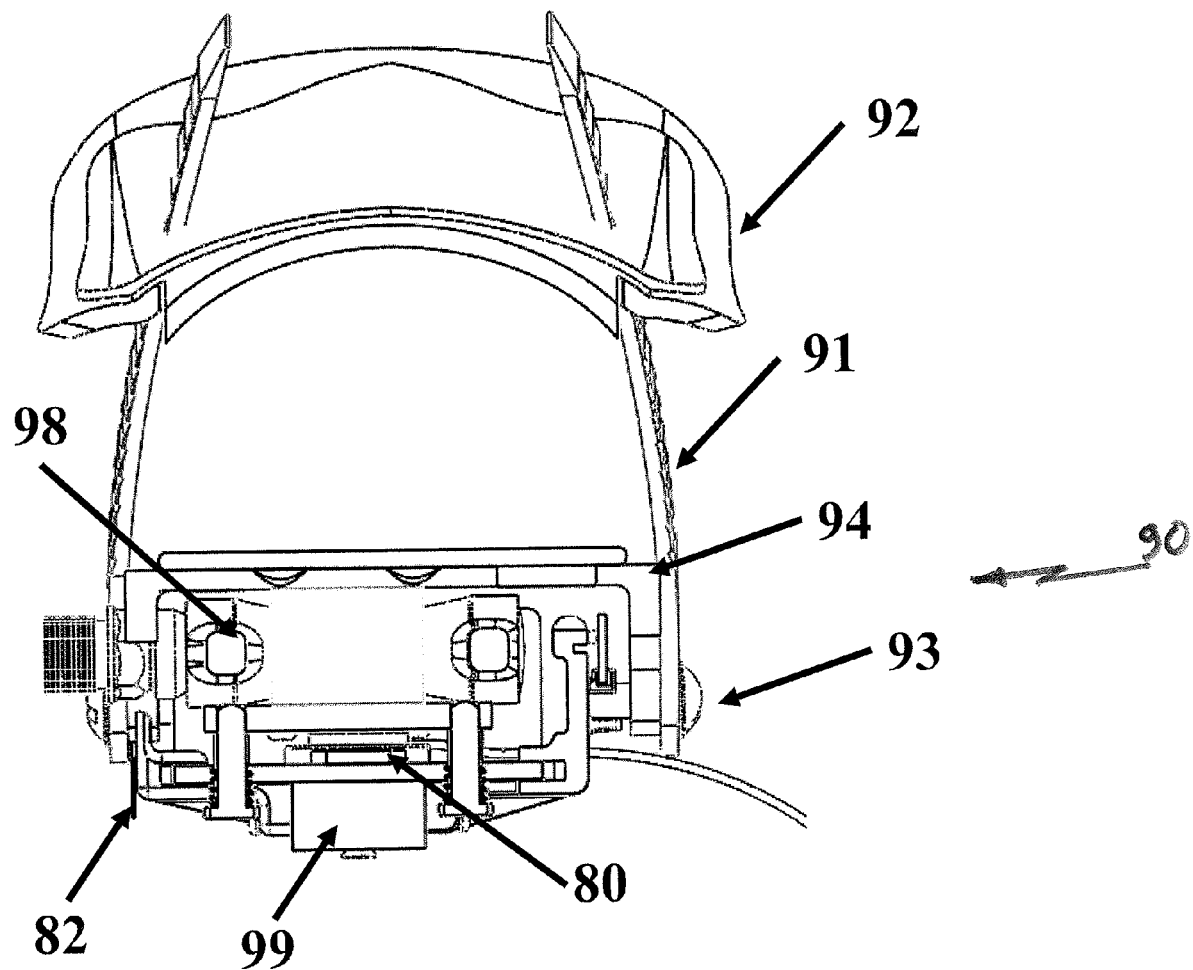
FIG. 3C shows a rear view of an instrumented pedal module shown in FIG. 3A.
Figure 3D:
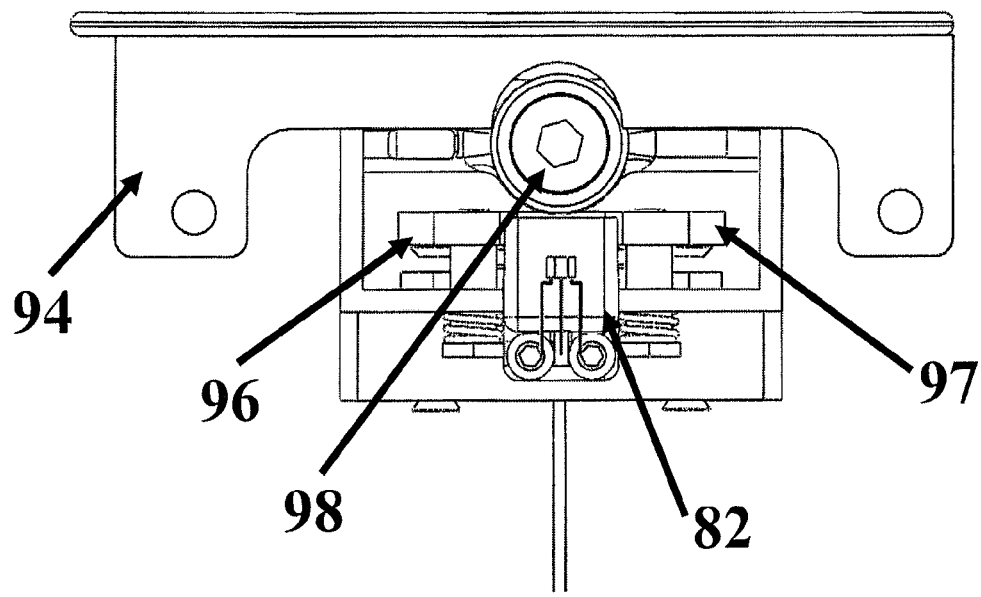
FIG. 3D shows an elevation view of the pedal assembly of an instrumented pedal module shown in FIG. 3A.
Figure 3E:
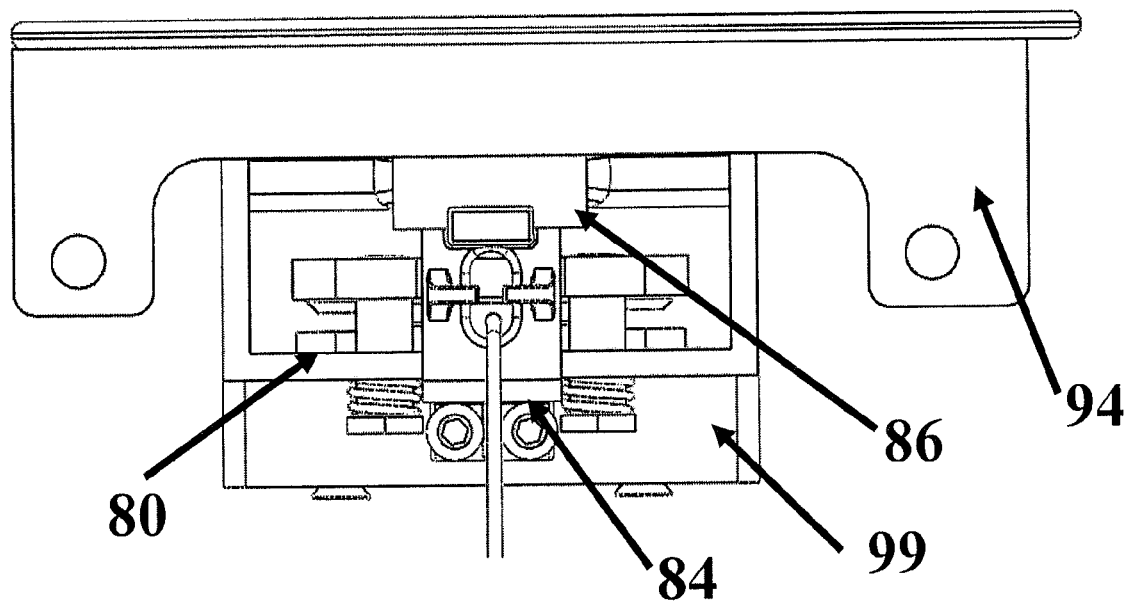
FIG. 3E shows an opposite elevation view of the pedal assembly of an instrumented pedal module shown in FIG. 3A.

Referring to FIG. 3A, there is shown a diagrammatic view of an illustrative embodiment of a pedal module 14 that is uniquely designed to attach to a crankshaft of a bicycle, stationary bicycle, or any other instrument with a removable pedal. Preferably, the pedal module 14 includes a commercially-available pedal 40 having standard $9/16"\times 20"$ thread, such as the Wellgo M-21 ATB manufactured by Wellgo of Taichung Hsien, Taiwan, to be compatible with adult bicycles equipped with two- and three-piece crank assemblies. The pedal raceways 98 of these pedal assemblies 90 include built-in roller bearings and four attachment points to accommodate a cage of a toe clip.

Figure 3F:
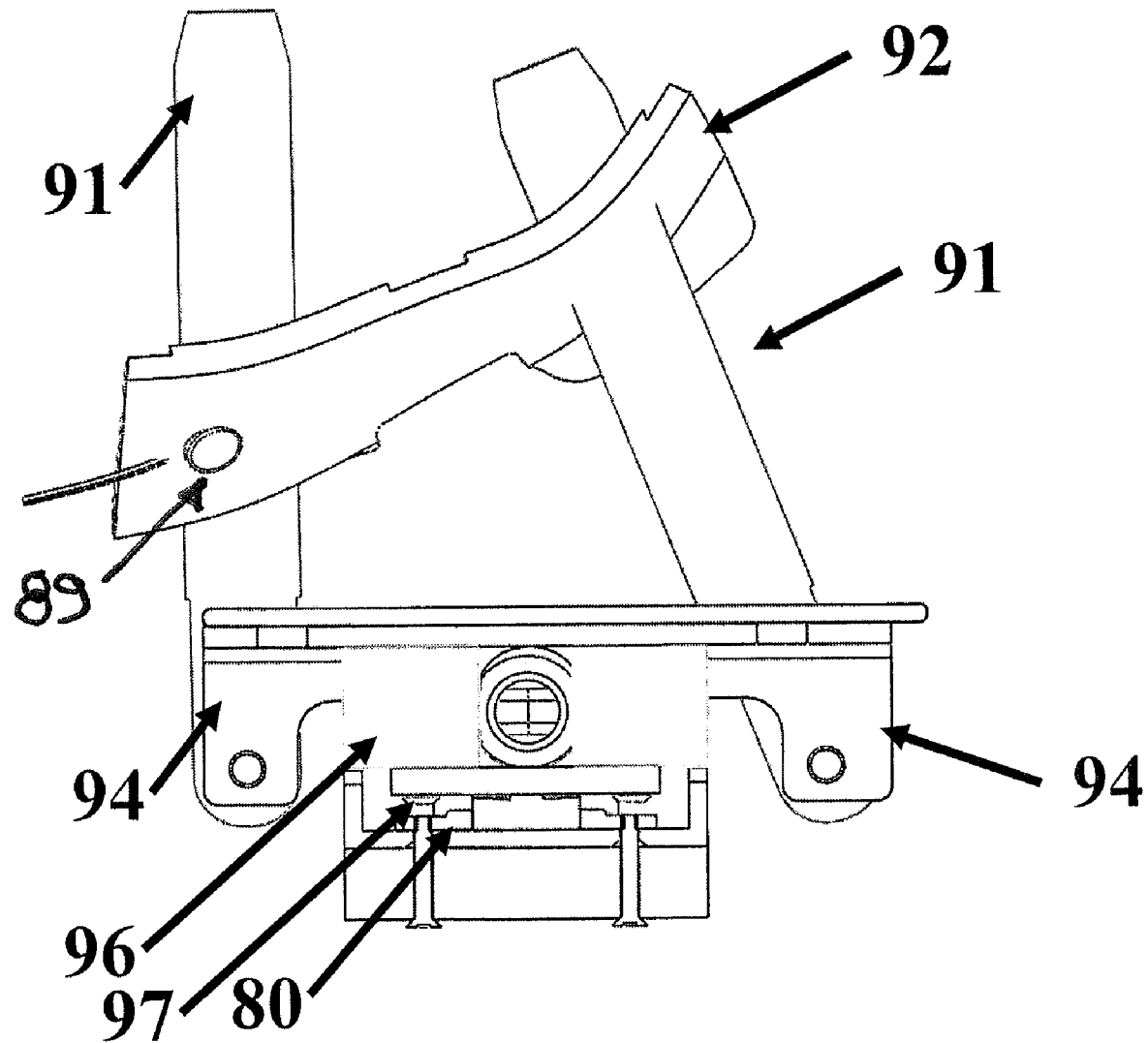
FIG. 3F shows an elevation view of the pedal assembly and binding scheme for an instrumented pedal module.

Referring to FIGS. 3B-3F, details of a pedal module 14 are shown. The structure of the pedal assembly 90 provides the means for accommodating a pedal raceway 98 and locations for disposing the various sensing devices needed to capture kinetic and kinematic parameters during a user session. For the purpose of transferring force from the user's foot to a compression load cell 80, the pedal assembly 90 structure includes a foot plate 94, a force block 96, an intermediate block 97, and a counterweight block 99. As shown in FIG. 3F, force from the user's foot is applied directly to the foot plate 94 or, optionally, to a wearing pad attached thereto. Force from the foot plate 94 is, further, transferred to the compression load cell 80, which is preferably disposed directly beneath the pedal raceway 98, via the force block 96 and the intermediate block 97.

The force blocks 96, e.g., force blocks manufactured of acetal resin such as DELRIN, are structured and arranged to fit around the pedal raceway 98 so as to transfer user foot loads onto the, e.g., 3/16-inch thick steel, intermediate block 97 without having to modify the raceway 98 itself. Advantageously, the force blocks 96 transfer load about the raceway shaft while still maintaining their proper alignment.

The single-axis, compression load cell 80, e.g., a Model 13 Subminiature Load Cell manufactured by Honeywell of Columbus, Ohio, measures the force on the foot plate 94. A bolt and spring assembly 84, of a type that is well known to those skilled in the art, is integrated into the bottom of the pedal assembly 90 to provide pre-load compression, e.g., a 50-pound pre-load, to the pedal system, to enable measurement of tensile force during "up-pedalling". The resulting offset due to the pre-load can be zeroed using software. Accordingly, the load cell can measure tensile forces up to the magnitude of the pre-load, e.g., 50 pounds, and compressive forces of about 450 pounds.

In operation, any non-zero net force between the left and right pedals will cause the virtual user to "lean" towards the stronger side. Indeed, pedal compressive forces must remain symmetric in order to maintain the virtual user "vertical".

Referring to FIGS. 3A-3F, an exemplary binding scheme 95 for securing a user's foot to the pedal assembly 90 is shown. The pedal module 14 does not require the user to wear specialized footwear, so any binding scheme 95 must be widely adjustable to accommodate a range of shoe sizes and/or to cover more surface area than conventional toe clip pedals.

The binding scheme 95 uses, e.g., Flow Flite 4 bindings manufactured by Flow of San Clemente, Calif., which provide a readily-adjustable, robust, comfortable fit while securing the user's metatarsal-phalanges joint immediately above the pedal's axis of rotation. Those of ordinary skill in the art can appreciate that a myriad of alternative binding schemes are possible.

The binding scheme 95 includes front and rear binding ladder portions 91 and front and rear binding pads 92. The binding ladder portions 91 are securely and releasably attached to the foot plate 94, e.g., using fittings 93. As is well known to those of ordinary skill in the art, the ladder portions 91 are tightened to or against the user's foot (or footwear) by ratcheting the free running end of the ladder portions 91 into a binding buckle. The ratchetable ladder portions 91 and the binding buckle can be disposed on the inside or on the outside of the user's foot.

Alternatively, snowboard bindings, e.g., snowboard bindings manufactured by Flow or San Clemente, Calif., can also be attached across the dorsal side of the user's foot, to accommodate anthropometric variability.

In addition to the compression load cell 80, sensing instrumentation can include an optical encoder, continuous mechanical rotary potentiometer, or multi-axis accelerometer 86 for sensing static pedal tilt and a sensing device 82, e.g., a Hall effect sensing device for registering the pedal home position. Alternatively, this can also be an Infra-red sensor, mounted and functioning in the same way. A two-axis, ±5 g accelerometer manufactured by Dimension Engineering of Akron, Ohio was used by the inventors. The accelerometer 86 can be mounted to the pedal assembly 90 using a mounting bracket 88, which can be fixedly attached to the foot plate 94. Preferably, when mounted, the Y-axis of rotation of the accelerometer 86 is aligned with the axis of rotation of the pedal raceway 98. The range of motion of the user's ankle is monitored by the accelerometer 86, which detects tilt in dorsi- and plantarflexion.

A latching, single-phase Hall effect sensing device 82 such as the AH375 sensing device manufactured by Diodes Incorporated of Westlake Village, Calif. can be used in combination with a plurality of magnet posts (not shown) to measure the velocity of the rotating raceway 98. Preferably, one of the magnet posts can be mounted on the stationary exercise bicycle housing in opposite, alternating poles at a top, dead center, 90° clockwise of dead center (CW), 180° CW, and 270° CW. The sensing device 82 itself can be mounted on a portion of the pedal below the raceway axis of rotation so that as the pedal rotates about the crankshaft, so does the sensing device 82.

In operation, during a user session, as the user's lower extremities force the pedal assembly 90 and, more specifically, the sensing device 82 to rotate about the raceway axis of rotation, the sensing device 82 detects changes in the polarity of the magnetic field associated with each of the magnet posts. With each change in polarity, the voltage signal output by the sensor 82 changes. Because each change in polarity and output signal occurs at 90-degree ($\pi/2$ radians) intervals, velocity (in RPMs) can be determined quickly. As previously described, pedal RPM is used to propel the virtual user in the VR simulation. One skilled in the art can derive a pseudo-velocity, e.g., in miles per hour, using these data.

Figure 3G:
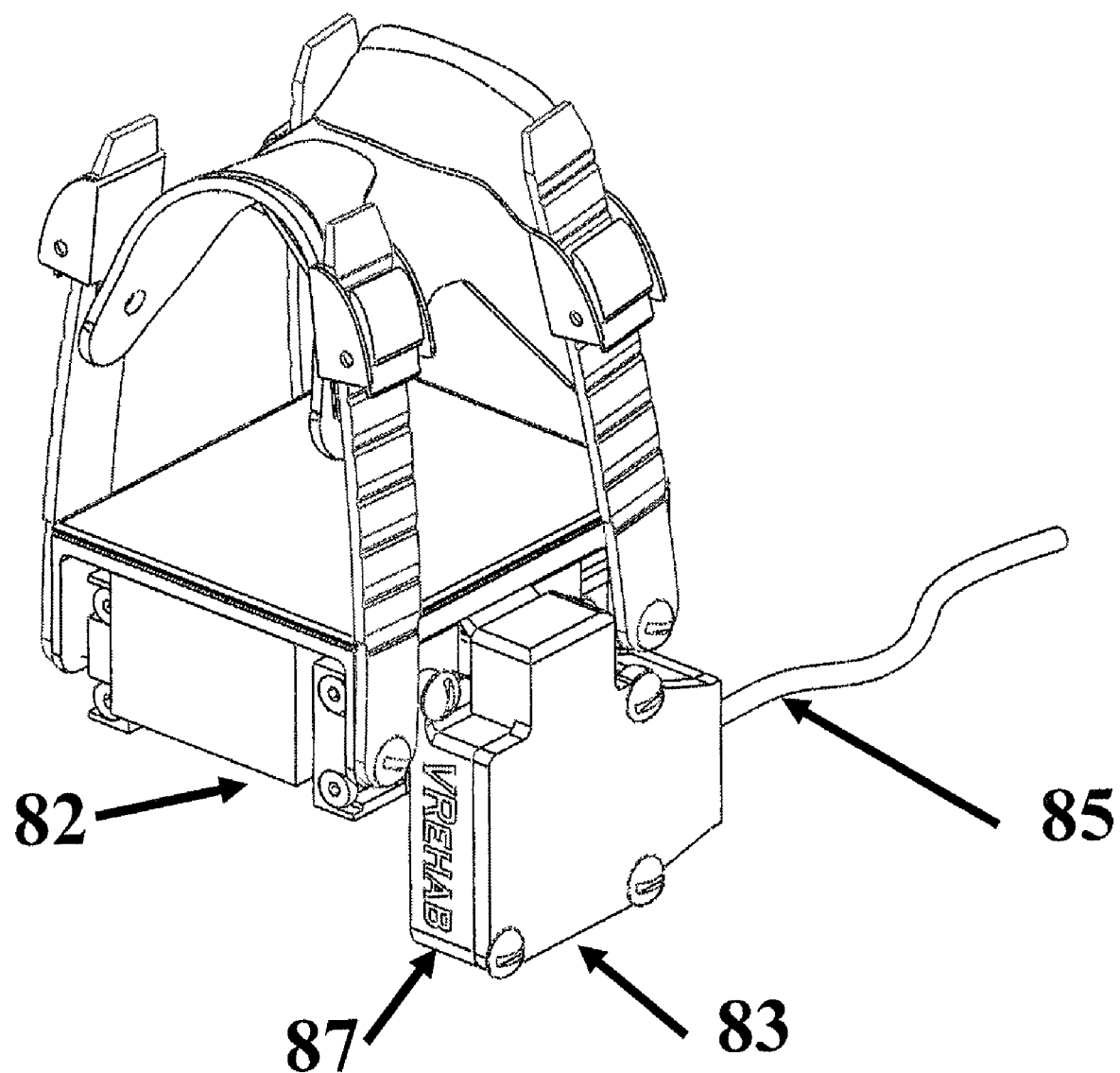
FIG. 3G shows an isometric view of a pedal assembly with an optional side enclosure for protecting electronics and electrical connections.

Referring to FIG. 3G, as an alternative to measuring velocity with a Hall effect sensor, an inertial measurement unit (IMU) 82 can be mounted in-line with the pedal raceway 98. The mounted IMU 82 is adapted to measure rotation of the pedal raceway 98, velocity of the crankshaft (in RPMs), and the position of the crankshaft. Preferably, to ensure acceptable signal clarity and low drift of the IMU 82, infrared (IR) interrupters (not shown) can be disposed on the pedal assembly 90 and on the chassis of the bicycle 15 to facilitate dead reckoning of the IMU 82 from known positions. In operation, when the arcs are completed during each pedal rotation cycle, the moving IMU 82 will trigger the IR interrupters to zero rotational error.

To provide haptic feedback to the user, vibration elements 89 can be integrated into the pads 92 of the binding scheme 95. Compact, shaftless vibrators, e.g., the model 310-101 vibrator manufactured by Precision Microdrives of London, England, were used by the inventors. For example, vibration elements 89 can be attached, e.g., using hook and loop fasteners such as VELCRO and the like, to the inside portion of the pads 92 which is closest to the user's foot. If a particular user has loss of sensitivity to the dorsal side of his/her foot, the vibration elements 89 could be re-located, e.g., to only the half of the bindings closest to the rider's saggital plane, or a particular region of the rider's foot.

Vibration elements 89 are adapted to provide haptic feedback to the user when triggered by events within the virtual environment in order to alert the user to take some corrective action, e.g., to return to the riding path after riding off the path. A combination of haptic and visual feedback has been studied for ankle movements with post-stroke patients and improves selected physical parameters. Indeed, the combination has a stronger impact on rehabilitation than either stimulation alone.

Strain gauge amplifier units (SGAU) such as those manufactured by Industrologic of St. Charles, Mo. can be included to amplify the signal outputs from the load cells 80. These amplifiers include a full Wheatstone bridge and have an operating range of 8-30V DC with a built-in 5V regulator for the sensor excitation. These amplifiers can operate in single-ended mode for use with load cells 80.

For example, the SGAU circuit assembly has a fixed gain resistor of 100 ohms in series with a 1K trimmer potentiometer (VRG), allowing the amplifier gain to range from 1000 with the trimmer fully clockwise (100 ohms) to 90.9 with the trimmer fully counterclockwise (1100 ohms). The voltage signal offset may be adjusted by turning the VRO terminal. The span of the load cell amplifiers were shunt calibrated to each load cell using a 59 k$\Omega$ resistor to bridge the E- and S-terminals and then adjusting the voltage offset to zero when the resistor was removed.

Asymmetry in pedaling is characteristic of impairments following, for example, a cerebrovascular accident and other pathologies that predominantly affect the function of one side of the body. Each pedal module monitors the force from the user's left and right lower extremities individually. In the virtual environment, the data of average forces exerted on the left and the right pedal assemblies are used to maintain the virtual user in a vertical orientation.

Optionally, referring to FIG. 3G, there is shown a side enclosure 83 with an end cover 87 for protecting electronics and electrical connections from damage. For carrying parameter data signals from the sensing devices to the signal box 17, high-flexibility SVGA cables 85 and double-braided shielding can be used, which provide high-flexibility and noise blocking. Shielded cables and plugs 85 provide enhanced signal integrity.

Heart Rate Sensing Device

The heart rate of the user can be used to control the image of the pace rider's relative location with respect to the user rider's location in the image of the virtual environment 13, to serve as a motivational tool to cause the user to speed up or slow down his/her actual pace. For example, if the user deviates too far from a pre-established and/or practitioner-set heart rate then the image of the pace rider in the virtual environment 13 will overtake or, alternatively, slow down to encourage the user, respectively, to increase or decrease his/her level of exertion.

A heart rate sensing device 16, such as the RE07L wireless heart rate receiver manufactured by Polar Electro Inc. of Lake Success, N.Y., is adapted to drive the pace rider in the virtual environment 13. The heart rate sensing device 16 detects each heart beat, outputting a corresponding signal for each heart beat. Advantageously, the sampling frequency of the Polar system is faster than the highest possible heart rate for a healthy human.

Preferably, the heart rate sensing device 16 includes a chest band that the user wears during exercise. When properly worn, the transmitter of the heart rate sensing device 16 is in skin contact just below the center of the user's sternum. The chest band is adapted to output multiple (three) pulses for each heart beat detected; although, only one of the three pulses needs to be detected by the receiver of the signal box 17 to register a heartbeat. The device 16 provides coded communication to improve noise reduction and cross-talk from other sensors by automatically re-modulating the communication frequency when in close proximity to the chest band. It has an operating range of 80-105 cm and operating frequency of around 5 kHz.

As part of a remodulation sequence, during initial startup of each exercise session, output signals from the chest band must begin within 50 cm from the receiver for approximately 5 heartbeats. Before an exercise session, the practitioner will have pre-set the target heart rate of the user. As previously mentioned, this target heart rate controls the position and rate of a pace rider which the user is motivated to keep up with or ahead of throughout the exercise. The difference between the target heart rate and the measured value from the user determines the location of the pace rider relative to the virtual user. This location may be in front or behind, depending on which value is greater.

Selection criteria for the heart rate sensing device 16 can include sensitivity unencumbered by activity level and high reliability under elevated levels of moisture and sweat. Furthermore, the user must not be hindered in performing his/her tasks by discomfort or constrained motion, and/or low power and bandwidth requirements.

Signal Box, Data Acquisition Software, and Interface

The data acquisition system, e.g., a NI USB DAQ 6008 manufactured by National Instruments of Austin, Tex. is contained in the signal box 17 and is electrically coupled to the analog and digital sensor ports and with common GND terminals to the power source and amplifiers. The USB DAQ system affords the flexibility of a range of analog and digital input devices, while also supplying a +5V excitation to the smaller devices, e.g., the heart rate sensing device 16, haptic vibrating elements, and the like.

Inside the signal box 17, a discrete amplifier can be electrically coupled to each of the handle bar sensing devices 12 and each of the pedal load cells 14. These four amplifiers are electrically coupled to external sensors through the front of the housing along with the pedal accelerometers, hall effect sensor, vibrating elements, and heart rate receiver module.

LabVIEW Signal Interface and Main Interface Virtual Instruments (VIs) were created for this system, which utilize User Datagram Protocol (UDP) to send information from the VI to the Virtual Reality Software. The flow of information throughout the system is discussed in greater detail below in the VRehab Signal Interface section. The VRehab Signal Interface was used to prototype the third-party virtual reality simulation. The bike system includes eight sensors, and all of these sensors are emulated using the signal interface. The signal interface is programmed to send data signals using UDP that are identical to the signals that the actual.

Power Box

The power box 18, e.g., a LOGISYS ATX12V manufactured by LOGISYS of Pomona, Calif., is electrically coupled to the sensing modules 12, 14, and 16, which are disposed on the bicycle 15, and to the signal box 17. Preferably, the power box 18 is structured and arranged to provide GND, +5V excitation, and ±12V excitation to the system.

Practitioner (VRehab Signal) Interface

The practitioner interface 11 has several components and objectives. The interface 11 is a processing device, e.g., a personal computer, that includes a central processing unit, a display device, and input/output devices. Third-party software programs, e.g., VR software programs, are stored on the central processing unit or are stored elsewhere but easily accessed by the central processing unit. The interface 11 is used to acquire sensor data from the DAQ card of the signal box 17, e.g., at a frequency of 100 Hz, as well as to perform any necessary signal processing. Ultimately, the practitioner's interface 11 is used to display sensing data in real-time, e.g., on a display device, and to store and/or log that data into files for later evaluation.

Figure 4:
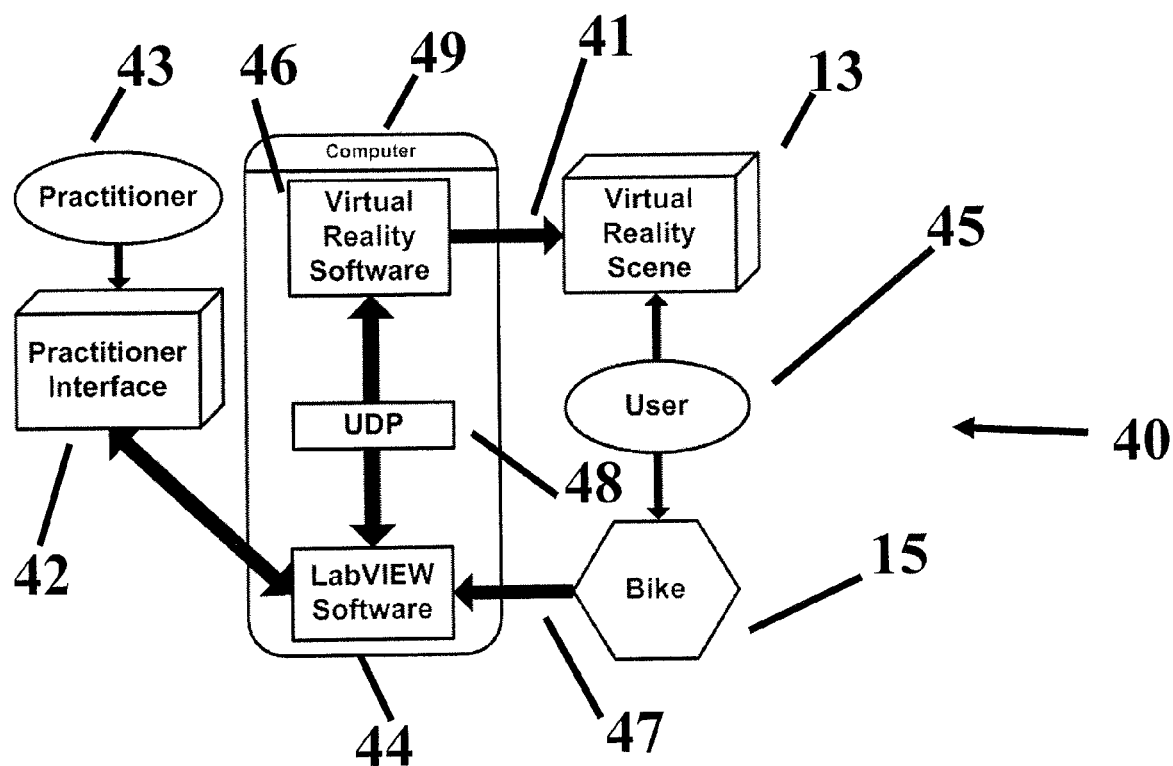
FIG. 4 shows an information communication flow chart.

Referring to FIG. 4, the VRACK system 10 is configured by the practitioner 43, e.g., using a configuration interface 42 such as a LabView Virtual Instrument (VI) that uses User Datagram Protocol (UDP) to transfer data from the VI to commercially-available or specially-designed VR software created by third-parties. FIG. 4 illustrates the flow of information 40 through the system.

For example, once a user session begins, performance and other parameter data 47 about the user 45 are transmitted from sensing devices 12, 14, and 16, which are disposed on the stationary, exercise bicycle 15 or attached to the user 45, to the practitioner's processing device 49, e.g., personal computer, via the signal box 17.

LabView software 44, which is available in or to the practitioner's processing device 49, enables the processing device 49 to process these data before transmitting the processed data to the third-party VR software 46 via UDP sockets 48 and to store these data for later use. The practitioner's processing system 49 is electrically coupled to a display device proximate to the user and the stationary, exercise bicycle 15, so that signals 41 generated by the VR software 46 create a VR scene 13 on the display device.

Figure 5:
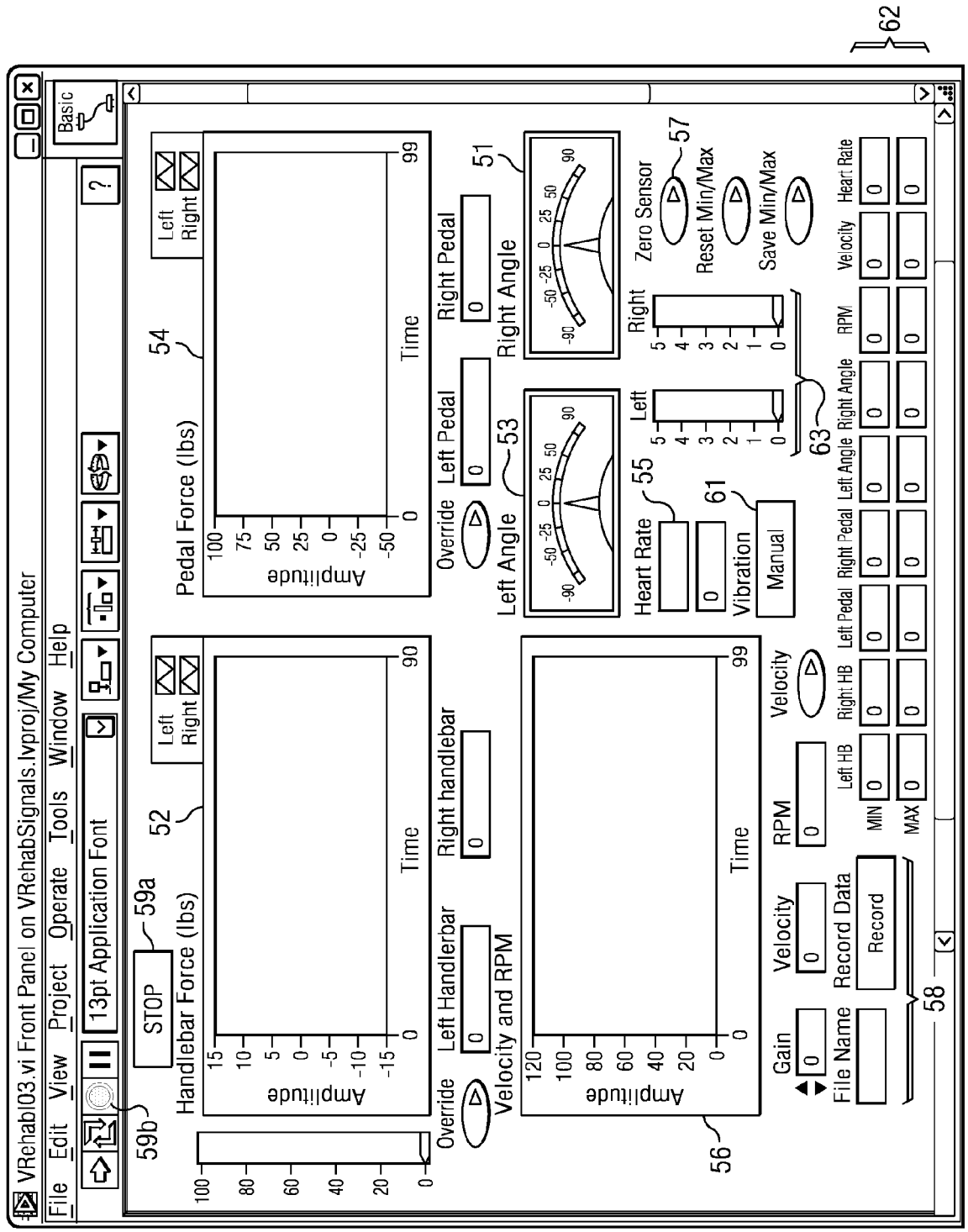
FIG. 5 shows a representative main interface front panel in accordance with the invention as claimed.

FIG. 5 shows an illustrative screen capture of the "VRehab" main interface's front panel 50. The main interface front panel of the interface 50 can include, without limitation, graphical and/or textual representations of and data and control means for handle bar force 52, pedal force 54, velocity and/or revolutions per minute (RPM) 56, and measured heart rate 55. Data of handle bar force 52 show the change in the force applied to each handle bar individually over time. Real-time force for each hand can be displayed numerically (as shown) below the graph 52. An override control button (also shown) can also be provided, to null the handle bar module signal being transmitted to VR simulation.

The pedal force graph 54 shows the change in pedal force data for each pedal with time. Real-time force for each pedal can be displayed numerically (as shown) below the graph 54. An override button (also shown) can also be provided, to null the pedal force signal being transmitted to VR simulation. Pedal tilt angle for each of the right and left pedals 51 and 53 is also provided. For illustrative purposes only, the pedal tilt angles can be displayed using virtual gauges that span from 90 degrees to −90 degrees.

The velocity and or revolutions per minute (RPM) graph 56 displays changes in RPM and velocity with time. Real-time RPM and velocity data can be displayed numerically (as shown) below the graph 56. A velocity control button (as shown) can be used to ensure that velocity data to the VR simulation never drops below a pre-established velocity, e.g., 5 RPMs. A gain control button (as shown) can be used to increase the velocity for VR simulation based on an RPM calculation.

Real-time, measured heart rate 55 and vibration level controls are provided. The measured heart rate 55 provides a numeric display of beats per minute (BPM). The vibration button 61 can be used to change control of the vibration elements between MANUAL (as shown) and SIMULATION. MANUAL control can be carried out by manipulating the left and right filler bars 63. SIMULATION control connotes that vibration data are read from VR simulation signals via UDP communication.

Maximum and minimum data, which show maximum and minimum readings taken from each of the aforementioned displays, are summarized in a maximum/minimum display 62.

Additionally, the interface 11 can be used by the practitioner to pre-establish target user heart rate and to control or adjust parameters before or during user exercise. The interface 11 also is adapted to send modified data to the VR simulation for display in the virtual environment 13, to provide accurate visual feedback in real-time to the user. Data are sent from the interface 11 to the VR simulation 13 via UDP communication.

A zero sensor button 57 is provided to normalize all sensor readings to prevent drift and can also be used to compare data. A stop button 59a can stop the interface between user sessions after finishing an exercise circuit or "loop". An emergency stop button 59b is provided to stop the interface without cleanly finishing the loop. File name and data recording buttons 58 are provided to manually name and record data in files.

Virtual Environment

The purpose of the virtual environment is to engage, motivate, and challenge the user to improve his/her performance during a session. This is accomplished by providing multi-sensory and performance feedback to the user throughout the session. Initial parameters are set by the practitioner on a VR Simulation Menu before a session begins.

Figure 6:
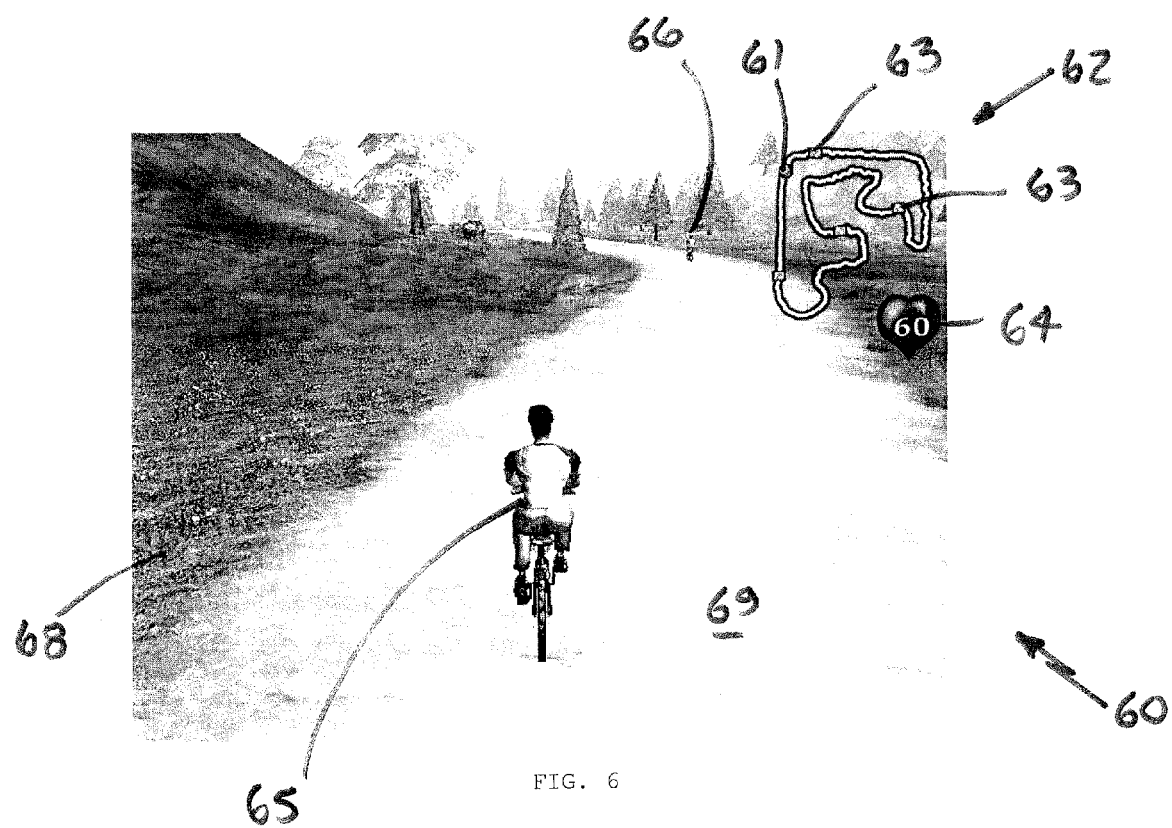
FIG. 6 shows embodiments of virtual reality images having a pace rider and a virtual rider.

An illustrative virtual environment image 60, which is displayed on a display device during a user session, is shown in FIG. 6. The upper right corner of the simulation 60 displays a circuit or loop map 62 of the virtual environment and the user's virtual location 61 on the map 62. The map 62 can include a plurality of checkpoints 63 to break the entire loop into a plurality of stages and, in combination with the user's virtual location 61, to provide an at-a-glance indication of the distance to the next checkpoint 63. Preferably, the degree of difficulty between adjacent checkpoints can vary or can be varied by the practitioner to simulate greater or lesser degrees of effort to negotiate, for example, longer/shorter stretches, a rising slope, a falling slope, and so forth. The instantaneous heart rate 64 of the user can also be displayed.

The illustrative virtual environment 60 is divided into two regions: a sandy, tan path 69, which the user's avatar ("virtual user 65") and the pace rider 66 are supposed to traverse, and a green, rough area 68 that bounds the path 69, which is to be avoided. Dark, muddy patches (not shown) on the path 69 are designed to slow down the virtual user 65 and are, hence, intended to be avoided. Avoiding obstacles requires the user to turn the handle bars to avoid them. Failure to steer clear of the muddy patches will result in additional resistive force in the pedal modules 14. Similarly, steering the virtual user 65 onto the green area 68 can, further, trigger vibrating elements to replicate vibrations coming from the topography associated with rough terrain, to alert the user that he/she has wandered off of the riding path 69.

Users or, alternatively, practitioners can selectively designate some point on the map 62 to be the starting point. As a default, the user can always begin at the beginning or at the last checkpoint reached by the user during a previous session. The degree of difficulty of a user session is also variable and can be practitioner or user selected. In addition to the pitch angle of a rising slope, the width of the trail 69 and the distance for the user to travel can be used to affect the degree of difficulty of a user session.

Data are sent from the LabView Software 44 of the interface 49 to the VR Software Simulation 46 to control the virtual user 65. RPM data control the speed. Handle bar force data control the heading (yaw) of the virtual user 65. Pedal kinetics control the tilt of the virtual user 65. Heart rate data are used to control the relative speed of the pace rider 66.

Results of Testing

A healthy user and two post-stroke users participated in an eight-week program prepared by the inventors, to determine if cardiovascular and motor control improvements could be measured after training.

Figure 7:
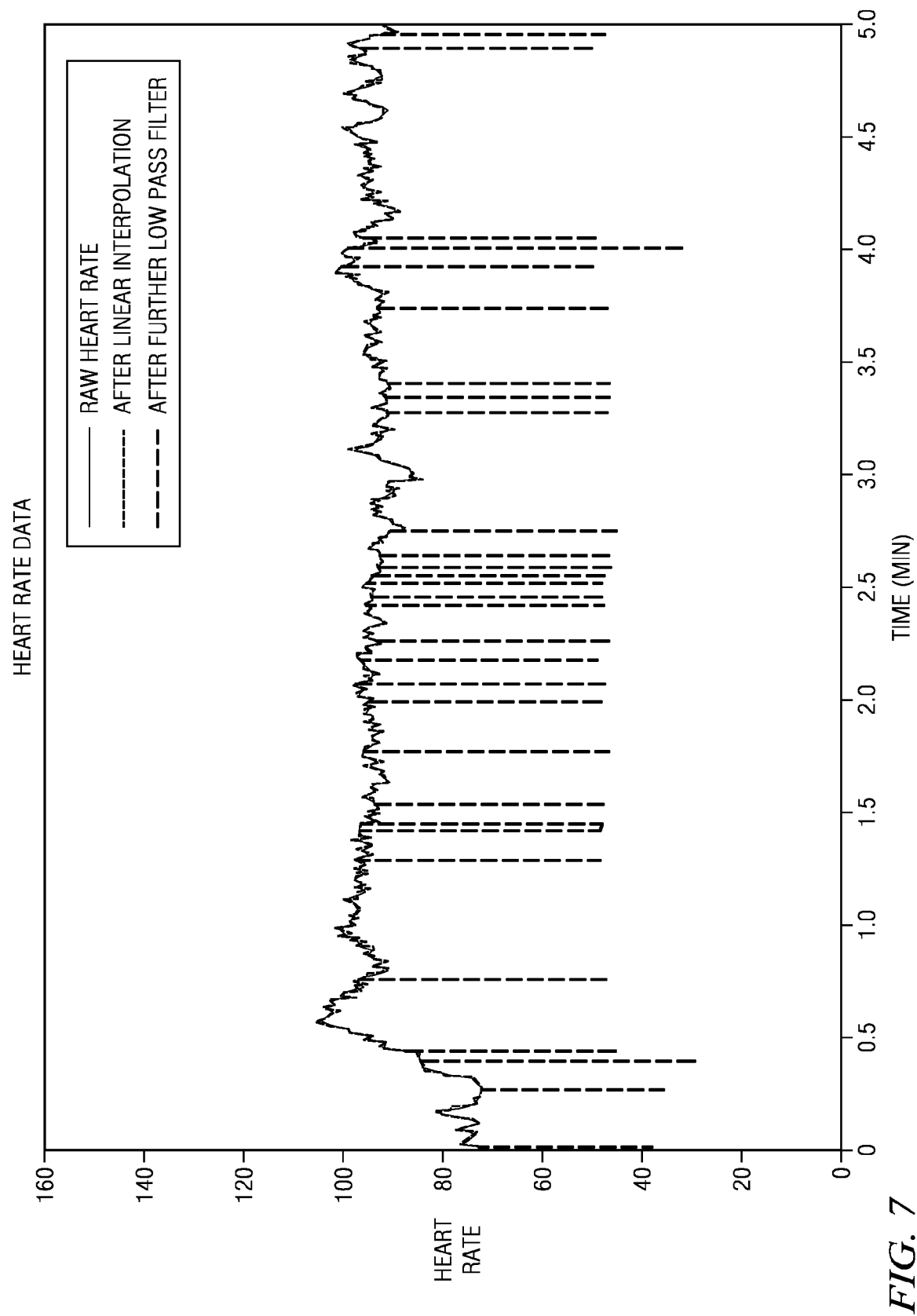
FIG. 7 shows representative heart rate over time data.

Representative heart rate data collected from the healthy user are summarized in FIG. 7. Noise in heart rate data can be eliminated using a linear spline interpolation followed by a $4^{th}$ order low pass Butterworth filter having a cut-off frequency of 0.5 Hz. These data demonstrate an appropriate response to exercise and correspond to concurrent measurements taken manually by an experienced clinician.

Figure 8:
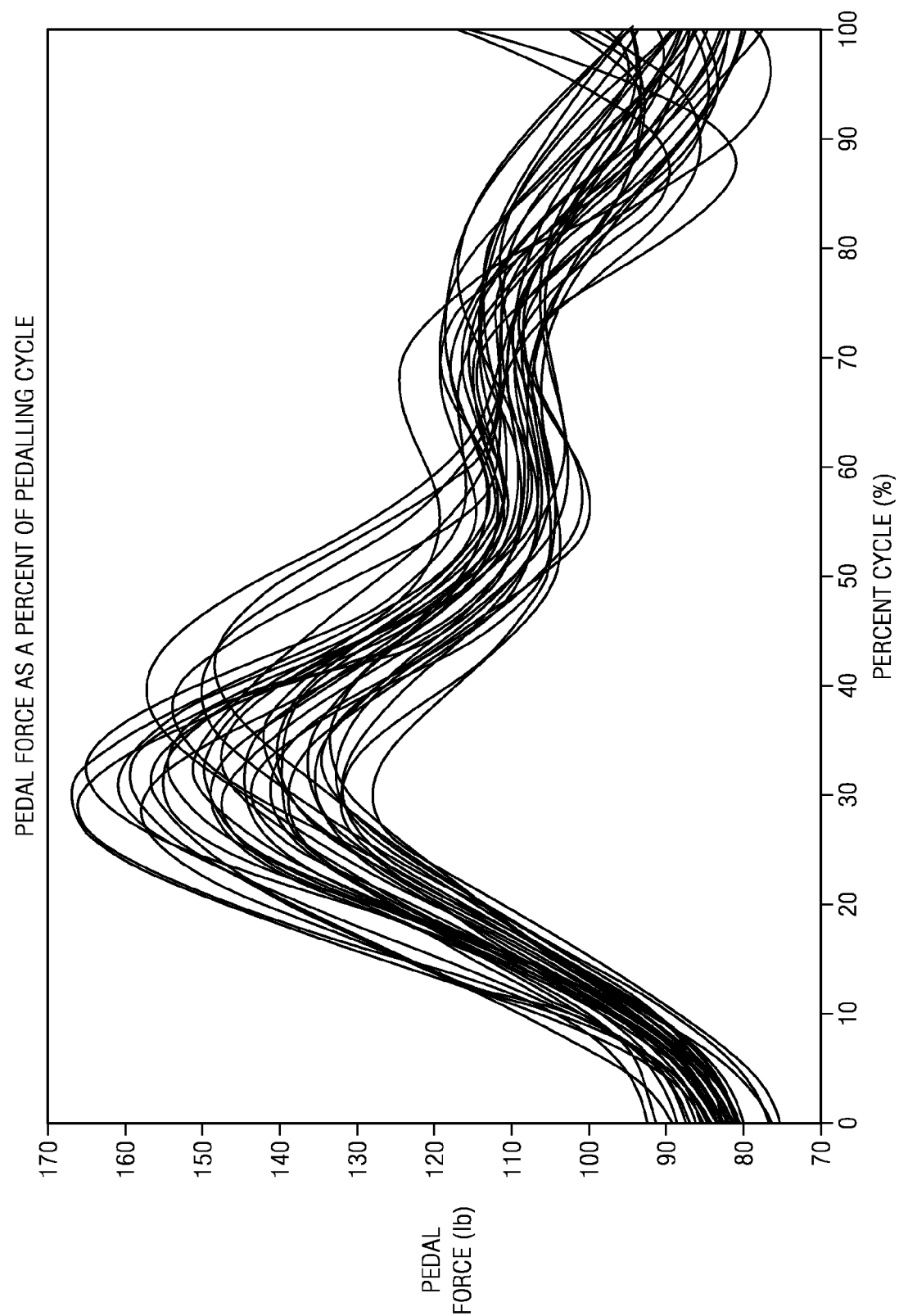
FIG. 8 shows representative pedal force as a percentage of a pedaling cycle.

FIG. 8 summarizes pedal force characteristics for approximately 40 consecutive cycles for the healthy user. The pedal data represented in the figure are the data filtered post collection using a $4^{th}$ order low pass Butterworth filter having a cut-off frequency of 5 Hz. Peaks, which indicate the maximum compressive force on the pedal, occur during the downstroke around 30-40 percent of the pedalling cycle for the healthy individual.

Figure 9:
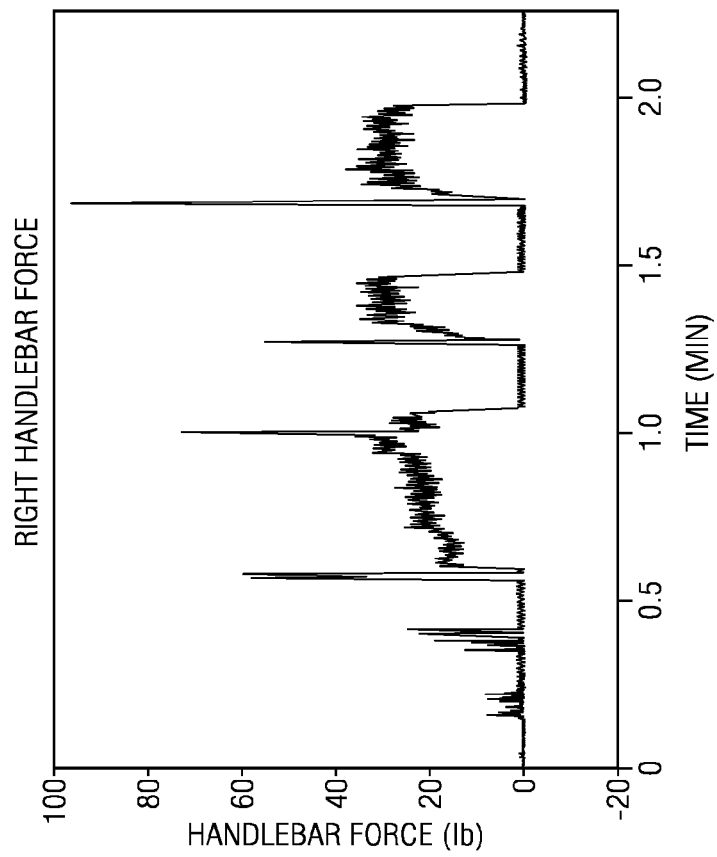
FIG. 9 shows representative handle bar forces during pedaling for the left and right hand.
Figure 9:
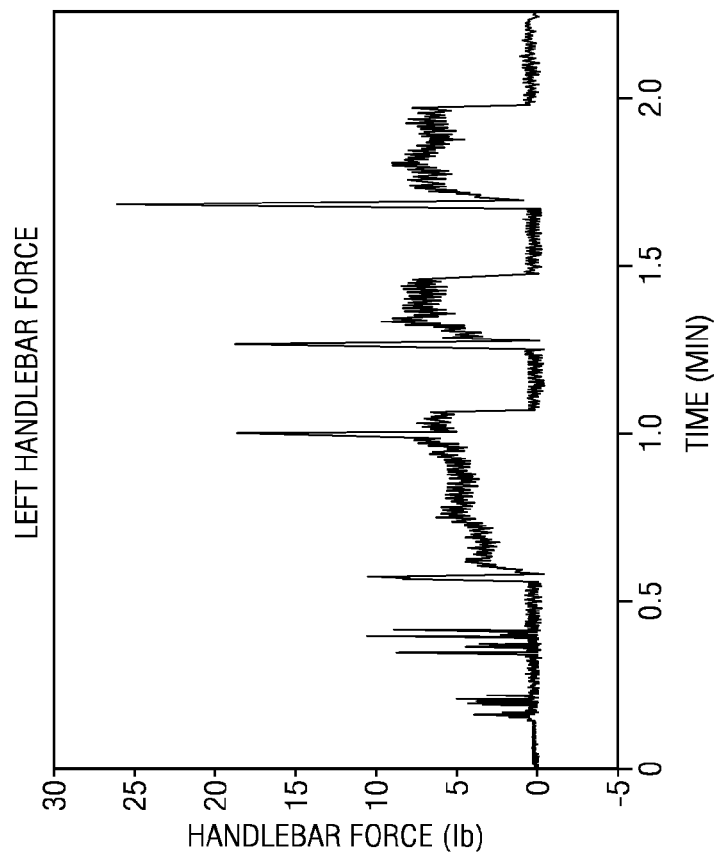

FIG. 9 summarizes the handle bar forces applied on the left and right handle bar modules during a trial by a healthy user. As depicted in the figure, the handle bar modules recorded nearly zero forces when user's hands were not in contact with the handlebars and recorded positive grasping forces when used to manoeuvre the virtual user through the virtual environment.

Although preferred embodiments of the invention have been described above, it will be recognized and understood that various modifications may be made in the invention and that the appended claims are intended to cover all such modifications which fall within the spirit and scope of the invention.

What is claimed is:

1. A virtual reality augmented system for a mechatronic device for generating and displaying a virtual environment based on parameter data generated by a user of the mechatronic device during a user session, the system comprising:
   one or two pedal assembly modules for sensing and measuring separately for each foot of the user forces in both compression and tension and static or dynamic pedal tilt, wherein each pedal assembly module includes: a pedal having a pedal raceway; a load cell that is disposed directly or substantially directly beneath the pedal raceway, for measuring load from a lower extremity on the pedal, the load cell structured and arranged to provide kinetic and kinematic parameter data to a processing device associated with the mechatronic device; a spatial orientation detection device for sensing the static or dynamic pedal tilt by measuring a range of motion of an ankle of the user, the spatial orientation detection device being structured and arranged to provide tilt parameter data to the processing device; and a sensing device for sensing velocity, the velocity sensing device structured and arranged to provide velocity parameter data to the processing device;
   one or two handle bar assembly modules for sensing and measuring separately for each hand of the user a gripping and/or turning force on each handle bar of the mechatronic device;
   a data acquisition system that is electrically coupled to each pedal assembly module and each handle bar assembly module to receive the parameter data separately therefrom and that is structured and arranged to process the parameter data and to transmit the parameter data to the processing device;
   the processing device is structured and arranged to receive the parameter data from the data acquisition system and to use said parameter data to drive the virtual environment that is viewable by the user of the mechatronic device; and
   a display device that is disposed proximate to the mechatronic device to be viewable by the user, the display device displaying the virtual environment generated by the processing device.

2. The system as recited in claim 1, further comprising a heart rate sensing device having a chest band that is attached to the user and that is structured and arranged to generate heart rate parameter data and to transmit said heart rate parameter data to a signal processing device that is used to establish speed of a virtual pace rider avatar in the virtual environment.

3. The system as recited in claim 2, further comprising a practitioner's interface that is structured and arranged to display parameter data from each of the pedal assembly modules, from each of the handle bar modules, and from the heart rate sensing device to provide real-time and historic parameter data.

4. The system as recited in claim 1, wherein the parameter data are used to control one or more of dynamic motion, speed, or alignment and angle of tilt of a virtual pace rider avatar in the virtual environment.

5. The system as recited in claim 1, wherein the mechatronic device is a stationary, exercise bicycle.

6. A mechatronic device for generating and displaying parameter data generated by a user of the mechatronic device during a user session, the system comprising:
   one or two pedal assembly modules for sensing and measuring separately for each foot of the user forces in compression and/or tension and static or dynamic pedal tilt, wherein each pedal assembly module includes: a pedal having a pedal raceway; a load cell that is disposed directly or substantially directly beneath the pedal raceway, for measuring load from a lower extremity on the pedal, the load cell structured and arranged to provide kinetic and kinematic parameter data to a processing device associated with the mechatronic device; a spatial orientation detection device for sensing the static or dynamic pedal tilt by measuring a range of motion of an ankle of the user, the spatial orientation detection device being structured and arranged to provide tilt parameter data to the processing device; and a sensing device for sensing velocity, the velocity sensing device structured and arranged to provide velocity parameter data to the processing device;
   the processing device is structured and arranged to receive the parameter data separately from each pedal assembly module;
   a data acquisition system that is electrically coupled to each pedal assembly module to receive the parameter data therefrom and that is structured and arranged to process said parameter data and to transmit it to the processing device; and
   a display device that is disposed proximate to the mechatronic device to be viewable by the user, the display device receiving from the processing device the parameter data generated by the user of the mechatronic device during the user session and displaying the parameter data.

7. The mechatronic device of claim 6, further comprising one or two handle bar assembly modules for sensing and measuring separately for each hand of the user a gripping force on each handle bar of the mechatronic device, wherein the processing device is further structured and arranged to receive parameter data separately from each of the handle bar assembly modules via the data acquisition system and to communicate handle bar assembly module data to the display device.

8. The mechatronic device of claim 6, further comprising a heart rate monitor to monitor the heart rate of the user during a user session, wherein the processing device is further structured and arranged to receive parameter data from the heart rate monitor via the data acquisition system and to communicate handle bar assembly module data to the display device.

9. The mechatronic device of claim 6, wherein said processing device is further structured to use said parameter data to drive a virtual environment that is viewable by the user of the mechatronic device and wherein the display device is further structured to display a virtual environment based on the parameter data generated by the user of the mechatronic device during a user session.

10. A mechatronic device for generating and displaying parameter data generated by a user of the mechatronic device during a user session, the system comprising:
   one or two handle bar assembly modules for sensing and measuring separately for each hand of the user a gripping and/or turning force on each handle bar of the mechatronic device, the handle bar assembly module comprises: a multi-piece handle bar housing that is structured and arranged to releasably attach to a handle bar of said mechatronic device, each piece of the housing including a plurality of channels; one or more hydraulic chambers for carrying hydraulic fluid, each of the one or more hydraulic chambers being mounted in the plurality of channels of each piece of the multi-piece handle bar housing, wherein each said chamber comprises an effective sensing zone for contacting a hand of the user during user interaction with the mechatronic device to which said handle bar assembly module is attached and a non-sensing zone positioned outside the effective sensing zone; one or more handle bar caps that are disposed on the handle bar housing and are associated with each of the one or more hydraulic chambers, each said handle bar cap being structured and arranged to constrain the portion of the associated hydraulic chamber positioned outside the effective sensing zone; and at least one sensing device that is fluidly coupled to each of the one or more hydraulic chamber for sensing a change in fluid pressure therein and for generating an output signal;

a processing device that is structured and arranged to receive the parameter data separately from each handle bar assembly module;

a data acquisition system that is electrically coupled to each handle bar assembly module to receive the parameter data therefrom and that is structured and arranged to process said parameter data and to transmit it to the processing device; and a display device that is disposed proximate to the mechatronic device to be viewable by the user, the display device receiving from the processing device the parameter data generated by the user of the mechatronic device during the user session and displaying the parameter data.

11. The mechatronic device of claim 10, further comprising one or two pedal assembly modules for sensing and measuring separately for each foot of the user forces in compression and/or tension and static or dynamic pedal tilt, wherein the processing device is further structured and arranged to receive parameter data separately from each of the pedal assembly modules via the data acquisition system and to communicate pedal assembly module data to the display device.

12. The mechatronic device of claim 10, further comprising a heart rate monitor to monitor the heart rate of the user during the user session, wherein the processing device is further structured and arranged to receive parameter data from the heart rate monitor via the data acquisition system and to communicate heart rate data to the display device.

13. The mechatronic device of claim 10, wherein said processing device is further structured to use said parameter data to drive a virtual environment that is viewable by the user of the mechatronic device and wherein the display device is further structured to display the virtual environment based on the parameter data generated by the user of the mechatronic device during a user session.

14. A method of generating and displaying a virtual environment based on parameter data generated by a user of a mechatronic device during a user session, the method comprising:

sensing separately forces applied by each foot of a mammalian user to a corresponding pedal assembly module of said mechatronic device;

outputting first parameter data signals from each corresponding pedal assembly module commensurate with the forces applied;

sensing static or dynamic pedal tilt separately for each foot of the user about the corresponding pedal assembly module;

outputting second parameter data signals commensurate with the static or dynamic pedal tilt of each corresponding pedal assembly module;

controlling alignment and angle of tilt of a virtual avatar in the virtual environment using a combination and/or modification of the first and second parameter data signals;

sensing separately a gripping force applied by each hand of the user to a corresponding handle assembly module of said mechatronic device;

outputting fluid pressure parameter signals commensurate with the gripping force applied to each corresponding handle assembly module;

controlling dynamic motion of the virtual avatar in the virtual environment using said fluid pressure parameter signals; and displaying the virtual environment to the user.

15. The method as recited in claim 14, wherein the sensing forces applied by each foot includes sensing forces in both compression and tension using a single-axis or a multi-axis compression load cell.

16. The method as recited in claim 14, wherein the sensing a gripping force includes sensing gripping forces applied to a dorsal surface and to a ventral surface of a handle bar assembly.

17. The method as recited in claim 16, wherein said sensing a gripping force includes measuring a differential pressure between forces applied to the dorsal and to the ventral surfaces.

18. The method as recited in claim 14, further comprising:
sensing a heart rate of the user during a user session;
outputting heart rate parameter data signals commensurate with the heart rate; and
controlling a velocity of a virtual pace rider in the virtual environment using said heart rate parameter data signals.

19. The method as recited in claim 14, further comprising controlling a yaw of the virtual avatar using a differential force between gripping forces applied by a left hand to a left handle bar and gripping forces applied by a right hand to a right handle bar.

20. The method as recited in claim 14, further comprising providing haptic feedback to at least one of the user and the mechatronic device.

21. The device as recited in claim 1, wherein the spatial orientation detection device is a single-axis or a multi-axis accelerometer, a gyroscope, a continuous rotary potentiometer or an optical encoder.

22. The device as recited in claim 1, wherein each pedal assembly module further comprises at least one vibrating device for providing haptic feedback to the user.

23. The device as recited in claim 1, wherein the pedal raceway is structured and arranged to mechanically couple to a crankshaft of a stationary, exercise bicycle.

24. The device as recited in claim 1, wherein each pedal assembly module further comprises a binding scheme for securing the user's foot to the pedal.

25. The device as recited in claim 1, wherein the velocity parameter data generated by the velocity sensing device controls dynamic motion and a speed of a virtual, pace rider avatar in the virtual environment.

26. A virtual reality augmented system for a mechatronic device for generating and displaying a virtual environment based on parameter data generated by a user of the mechatronic device during a user session, the system comprising: one or two pedal assembly modules for sensing and measuring separately for each foot of the user forces in both compression and tension and static or dynamic pedal tilt; one or two handle bar assembly modules for sensing and measuring separately for each hand of the user a gripping and/or turning force on each handle bar of the mechatronic device; wherein each of the handle bar assembly modules comprises: handle bar assembly module comprises:
- a multi-piece handle bar housing that is structured and arranged to releasably attach to a handle bar of said mechatronic device, each piece of the housing including a plurality of channels;
- one or more hydraulic chambers for carrying hydraulic fluid, each of the one or more hydraulic chambers being mounted in the plurality of channels of each piece of the multi-piece handle bar housing, wherein each said chamber comprises an effective sensing zone for contacting a hand of the user during user interaction with the mechatronic device to which said handle bar assembly module is attached and a non-sensing zone positioned outside the effective sensing zone;
- one or more handle bar caps that are disposed on the handle bar housing and are associated with each of the one or more hydraulic chambers, each said handle bar cap being structured and arranged to constrain the portion of the associated hydraulic chamber positioned outside the effective sensing zone; and
- at least one sensing device that is fluidly coupled to each of the one or more hydraulic chamber for sensing a change in fluid pressure therein and for generating an output signal; a data acquisition system that is electrically coupled to each pedal assembly module and each handle bar assembly module to receive the parameter data separately therefrom and that is structured and arranged to process the parameter data and to transmit the parameter data to a processing device; the processing device is structured and arranged to receive the parameter data from the data acquisition system and to use said parameter data to drive the virtual environment that is viewable by the user of the mechatronic device; and a display device that is disposed proximate to the mechatronic device to be viewable by the user, the display device displaying the virtual environment generated by the processing device.

27. The device as recited in claim 26, wherein the at least one sensing device is electrically coupled to the processing device to which said at least one sensing device is adapted to transmit fluid pressure parameter signals for controlling dynamic motion of a virtual avatar in the virtual environment.

\* \* \* \* \*